(12) United States Patent
Lovold et al.

(10) Patent No.: US 9,873,316 B2
(45) Date of Patent: Jan. 23, 2018

(54) ALL-TERRAIN VEHICLE

(71) Applicant: Polaris Industries Inc., Medina, MN (US)

(72) Inventors: Jeff S. Lovold, Roseau, MN (US); Steven C. Erickson, Roseau, MN (US); William B. Rodriguez, Roseau, MN (US); Jeremy R. Eichenberger, Warroad, MN (US); Alan S. Olson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 237 days.

(21) Appl. No.: 14/208,921

(22) Filed: Mar. 13, 2014

(65) Prior Publication Data

US 2014/0262584 A1 Sep. 18, 2014

Related U.S. Application Data

(60) Provisional application No. 61/780,339, filed on Mar. 13, 2013.

(51) Int. Cl.
*B60K 13/04* (2006.01)
*B60K 5/12* (2006.01)
(Continued)

(52) U.S. Cl.
CPC ............... *B60K 5/12* (2013.01); *B60K 13/04* (2013.01); *B60K 17/354* (2013.01); *B62K 5/01* (2013.01);
(Continued)

(58) Field of Classification Search
CPC ...... B60K 2005/003; B60K 5/04; B60K 5/12; B60K 5/1208; B60K 5/1216;
(Continued)

(56) References Cited

U.S. PATENT DOCUMENTS 3,863,445 A    2/1975  Heath
4,010,812 A *  3/1977  Bothwell ............... B62K 19/48
                                                180/227
(Continued)

FOREIGN PATENT DOCUMENTS

CA    2390603 A1    12/2003
CN    1651278       8/2005
(Continued)

OTHER PUBLICATIONS

International Search Report and Written Opinion of the International Searching Authority issued by the European Patent Office, dated Nov. 11, 2014, for International Application No. PCT/US2014/025859; 19 pages.
(Continued)

*Primary Examiner* — Katy M Ebner
(74) *Attorney, Agent, or Firm* — Faegre Baker Daniels LLP

(57) ABSTRACT

An ATV is disclosed having a frame and a plurality of wheels. A power train is defined by an engine, transmission and front and rear final drives. The engine is mounted to the frame skid plate by way of die cast legs. The transmission may include a CVT, which includes a cooling system to cool the interior of the CVT. The cooling system include a fan positioned on the driven clutch causing a reverse suction air flow, back through the drive clutch, with the air exhausting at the front of the engine.

52 Claims, 40 Drawing Sheets

(51) Int. Cl.
    *B60K 17/354* (2006.01)
    *B62K 5/01* (2013.01)
    *B60K 11/06* (2006.01)
    *B60K 13/02* (2006.01)

(52) U.S. Cl.
    CPC ............... *B60K 11/06* (2013.01); *B60K 13/02* (2013.01); *B60Y 2200/124* (2013.01); *B60Y 2400/72* (2013.01)

(58) Field of Classification Search
    CPC ...... B60K 5/1225; B60K 13/04; B60K 13/06; B60K 2015/0638; B60K 2015/0636; B60K 2015/0639; F01N 1160/20
    See application file for complete search history.

(56) References Cited

U.S. PATENT DOCUMENTS

| | | | | |
|---|---|---|---|---|
| 6,076,624 | A * | 6/2000 | Izumi | B60K 17/08 180/291 |
| 6,438,949 | B1 * | 8/2002 | Nozaki | B60K 13/04 123/184.21 |
| 6,755,269 | B1 | 6/2004 | Davis et al. | |
| 6,920,949 | B2 | 7/2005 | Matsuura | |
| 7,311,170 | B2 * | 12/2007 | Isoda | B60K 13/02 180/291 |
| 7,427,248 | B2 * | 9/2008 | Chonan | F16H 57/05 474/150 |
| 7,559,308 | B2 * | 7/2009 | Matsuda | F02B 75/20 123/195 AC |
| 7,854,290 | B1 | 12/2010 | McKoskey | |
| 2002/0038737 | A1 | 4/2002 | Morishita et al. | |
| 2005/0221936 | A1 | 10/2005 | Seki et al. | |
| 2006/0270503 | A1 | 11/2006 | Suzuki et al. | |
| 2006/0272873 | A1 | 12/2006 | Takashi | |
| 2008/0023240 | A1 * | 1/2008 | Sunsdahl | B62D 21/183 180/68.2 |
| 2010/0035078 | A1 | 2/2010 | Staudt et al. | |
| 2010/0243391 | A1 | 9/2010 | Wakabayashi et al. | |
| 2011/0108349 | A1 | 5/2011 | McClendon et al. | |

FOREIGN PATENT DOCUMENTS

| | | |
|---|---|---|
| JP | S58202111 A | 11/1983 |
| JP | H1111171 A | 1/1999 |
| WO | WO 2009/008779 | 1/2009 |
| WO | WO 2009/008779 A1 | 1/2009 |

OTHER PUBLICATIONS

Written Opinion of the International Preliminary Examining Authority dated Aug. 7, 2015, for International Application No. PCT/US2014/025859; 12 pages.

Written Opinion of the International Searching Authority dated Sep. 13, 2015, for International Application No. PCT/US2014/025859; 10 pages.

International Preliminary Report on Patentability (Chapter II) dated Oct. 9, 2015, for International Application No. PCT/US2014/025859; 31 pages.

* cited by examiner

ALL-TERRAIN VEHICLE

This application claims priority to Provisional Patent Application 61/780,339 filed Mar. 13, 2013, the subject matter of which is incorporated herein by reference.

BACKGROUND OF THE DISCLOSURE

The present disclosure generally relates to an ALL TERRAIN VEHICLE (ATV) and, more particularly, to an ATV having improved ergonomics and performance.

Generally, all terrain vehicles (ATVs) are used to carry one or two passengers and a small amount of cargo over a variety of terrains. Due to increasing recreational interest in ATVs, specialty ATVs, such as those used for trail riding, racing, and cargo hauling have entered the market place. Most ATVs include an engine including between one and three cylinders. Most ATVs include a straddle or saddle type seat positioned above the engine. Depending on the engine size and the number of cylinders, the width of the engine may become substantial, thereby requiring a wider seat. A wider seating surface may become uncomfortable for the rider, particularly shorter riders who may have trouble reaching the floorboards.

According to an illustrative embodiment of the present disclosure, an all-terrain vehicle includes a frame having longitudinally spaced-apart ends defining a first longitudinal axis. A pair of front wheels and a pair of rear wheels are operably coupled to the frame. An engine is supported by the frame and includes a plurality of cylinders and a crankshaft driven by the plurality of cylinders.

SUMMARY OF THE DISCLOSURE

In one aspect, an all terrain vehicle comprises a frame, comprising a lower longitudinally extending frame portion and an upper frame portion. The upper frame portion has longitudinally extending upper frame rails, at least one of the upper frame rails having an inward transition defining a first distance between the upper frame rails forward of the inward transition, and a second distance rearward of the inward transition, where the first distance is greater than the second distance. An engine is supported by the lower longitudinally extending frame portion, the engine having a crankshaft and a single cylinder, the crankshaft being oriented horizontally and transverse to a longitudinal axis of the vehicle, the cylinder being tilted forward with an exhaust port extending generally forwardly and an intake port extending generally rearwardly. An air box is supported by the upper frame rails, rearward of the inward transition. A throttle is positioned intermediate and coupled between the airbox and engine. Ground engaging members are drivingly coupled to the engine.

In another aspect, an all terrain vehicle comprises a frame; an engine supported by frame, the engine having a crankshaft being oriented transverse and horizontal to a longitudinal axis of the vehicle, the engine having a crankshaft and a single cylinder, the cylinder having an exhaust port extending generally forwardly and an intake port extending generally rearwardly. A continuously variable transmission (CVT) is positioned rearward of the engine and has a driven shaft being oriented transverse and horizontal to a longitudinal axis of the vehicle, the CVT further comprising a drive clutch coupled to the crankshaft and a driven clutch coupled to the driven shaft. A cooling assembly is coupled to the CVT, having a cover enclosing the drive and driven clutches, an intake duct is coupled to the cover to supply air to the driven clutch, and an exhaust dust is coupled to the cover to exhaust air from the driven clutch, the exhaust duct having an outlet port exhausting air generally adjacent to the engine exhaust manifold. Ground engaging members are drivingly coupled to, the engine.

In yet another embodiment, an all terrain vehicle comprises a frame, comprising a lower longitudinally extending frame portion and an upper frame portion, and a generally vertically extending support positioned between the upper and lower frame portions. An engine has a wet sump oil supply, the engine being coupled to the frame forward of the generally vertically extending support. Engine supports are coupled to the lower longitudinally extending frame portion and the engine, and suspend the engine above the lower longitudinally extending frame portion, and a rear engine mount couples the engine to the generally vertically extending support. Ground engaging members are drivingly coupled to, the engine.

In another aspect of the disclosure an all terrain vehicle comprises a frame, comprising a lower longitudinally extending frame portion and an upper frame portion, and a generally vertically extending support positioned between the upper and lower frame portions. The ATV includes an engine and a transmission where the rear side of the engine is coupled to a front side of the generally vertically extending support and a front side of the transmission is coupled to a rear side of the generally vertically extending support. Ground engaging members are drivingly coupled to the engine.

In another aspect, an all terrain vehicle comprises a frame, comprising a lower longitudinally extending frame portion and an upper frame portion. A powertrain is defined by an engine; a drive assembly, including a transmission, and a front final drive and a rear final drive. Engine supports are coupled to the lower longitudinally extending frame portion and the engine, and suspend the engine above the lower longitudinally extending frame portion. The rear final drive is coupled to rear wheels and the front final drive is coupled to the front wheels by a drive shaft, the drive shaft extending from the drive assembly to the front final drive, with the engine supports straddling the drive shaft.

In another aspect, an all terrain vehicle comprises a frame having a lower longitudinally extending frame portion and an upper longitudinally extending frame portion. The upper frame portion has longitudinally extending upper frame rails, where at least one of the upper frame rails has an inward transition defining a first distance ($D_1$) between the upper frame rails forward of the inward transition, and a second distance ($D_2$) rearward of the inward transition, where the first distance is greater than the second distance. The exhaust system comprises an exhaust tube with an inwardly angled portion at the inward transition, with the exhaust tube extending generally rearwardly along the upper frame rail portion rearward of the inward transition.

In another embodiment, an all terrain vehicle comprises an engine and a frame having a lower longitudinally extending frame portion and an upper longitudinally extending frame portion. An exhaust system comprises an exhaust tube extending generally rearwardly along the frame rearward of the engine and an exhaust shield, surrounding at least a portion of the exhaust tube, the shield including an inner and outer shield which conform to encompass a portion of the length of the exhaust tube, the inner and outer shields being coupled to the frame.

DETAILED DESCRIPTION OF THE DRAWINGS

Figure 1:
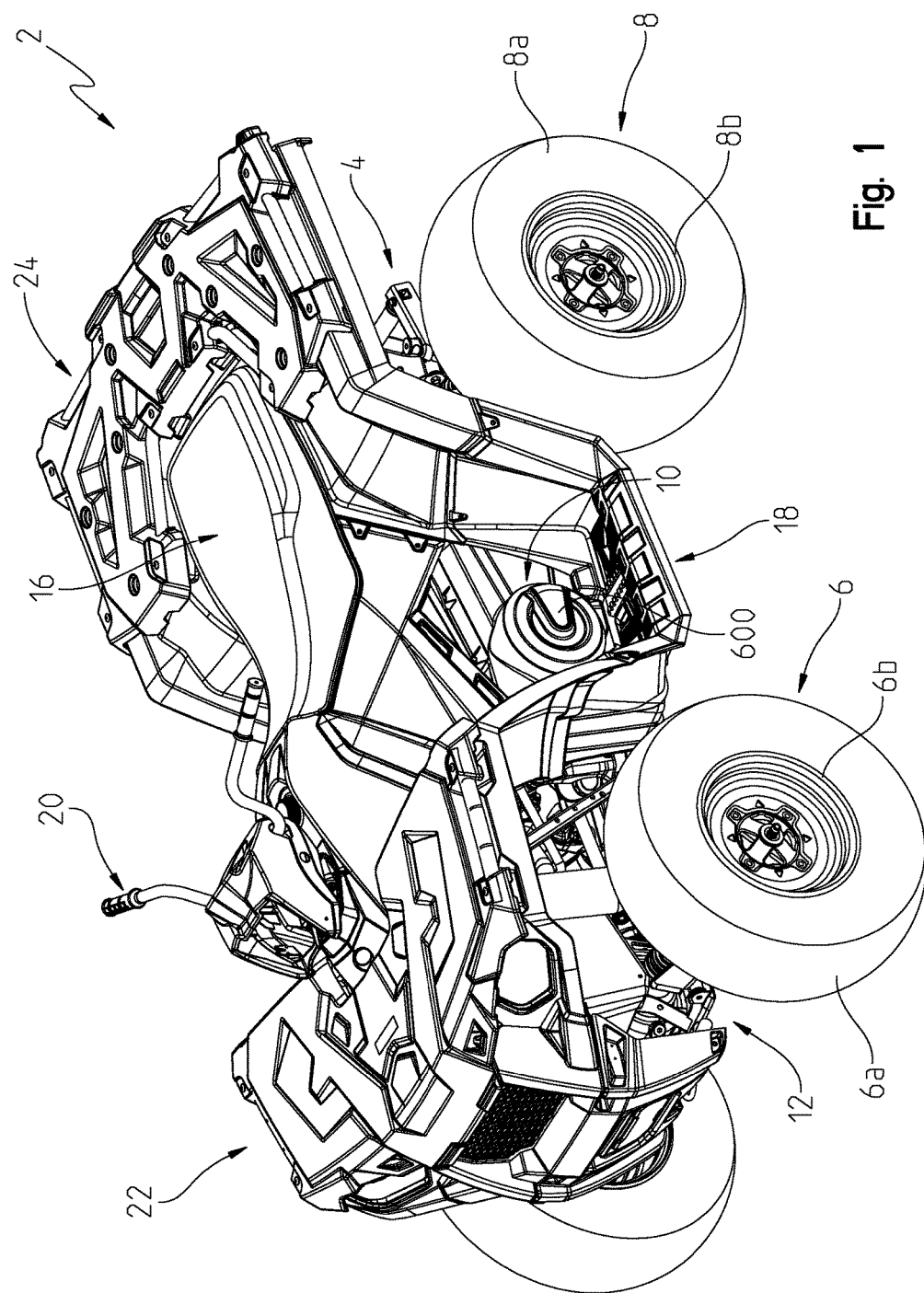
FIG. 1 is a front left perspective view of the all terrain vehicle of the present application.

Corresponding reference characters indicate corresponding parts throughout the several views. Unless stated otherwise the drawings are proportional. The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

Figure 2:
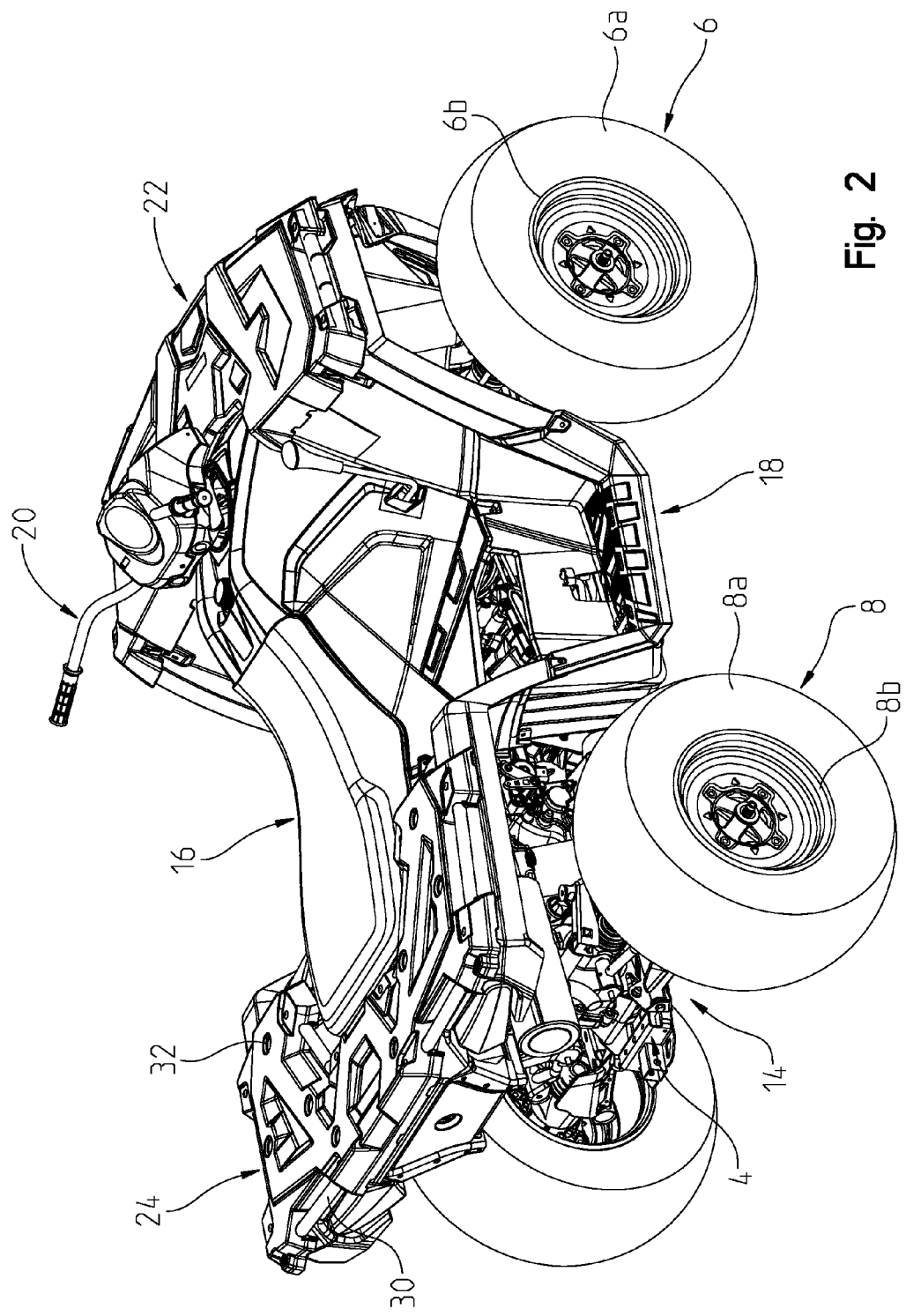
FIG. 2 is a right rear perspective view of the all terrain vehicle of the ATV of FIG. 1.

With reference first to FIGS. 1 and 2, a vehicle 2 is shown as an all-terrain-vehicle (ATV) including a frame 4 coupled to and supported by front wheels 6 and rear wheels 8. Front wheels 6 comprise tires 6a and rims 6b. Rear wheels 8 comprise tires 8a and rims 8b. ATV generally includes a power train shown at 10, which will be described in further detail herein. Front wheels 6 are coupled to frame 4 by way of a front suspension 12, and rear wheels 8 are coupled to frame 4 by way of a rear suspension 14. ATV further includes a seat assembly 16, which as shown in FIGS. 1 and 2 is for a single rider, but ATV 2 could be modified to incorporate two riders as described herein. ATV 2 also includes a steering assembly 20 for steering at least the front wheels 6 as is known in the art.

ATV 2 also includes an outer body, generally formed of a plastic material. Outer body may include at least foot pedestals 18 for placement of a rider's feet while riding. A front rack 22 is provided forward of steering assembly 20 and a rear rack 24 is provided rearward of seat 16. It should be appreciated that front rack 22 could include a plurality of tie downs and/or could include a moveable portion such as a hood to expose a storage cavity for storing items while riding. It should also be appreciated that rear rack 24 could include integrated tie down portions 30 such as those described in U.S. Ser. No. 12/012,587 filed Feb. 4, 2008, the subject matter of which is incorporated herein by reference. Front and or rear rack could also include apertures 32 for receiving an expansion member similar to that shown and/or described in U.S. Pat. No. 8,267,034, the subject matter of which is incorporated herein by reference.

Figure 3:
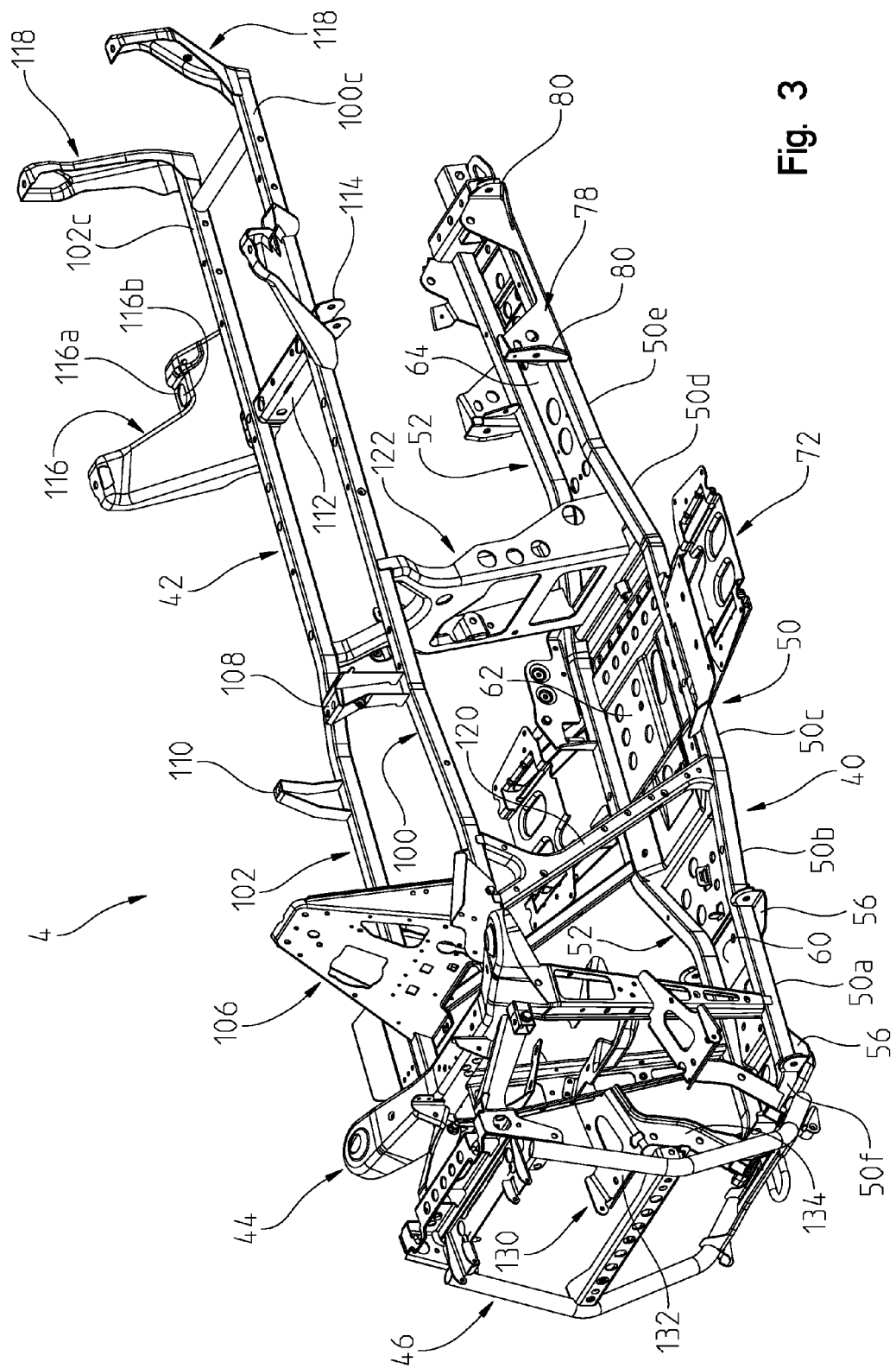
FIG. 3 is a front left perspective view of the frame for the all terrain vehicle of FIGS. 1 and 2.
Figure 4:
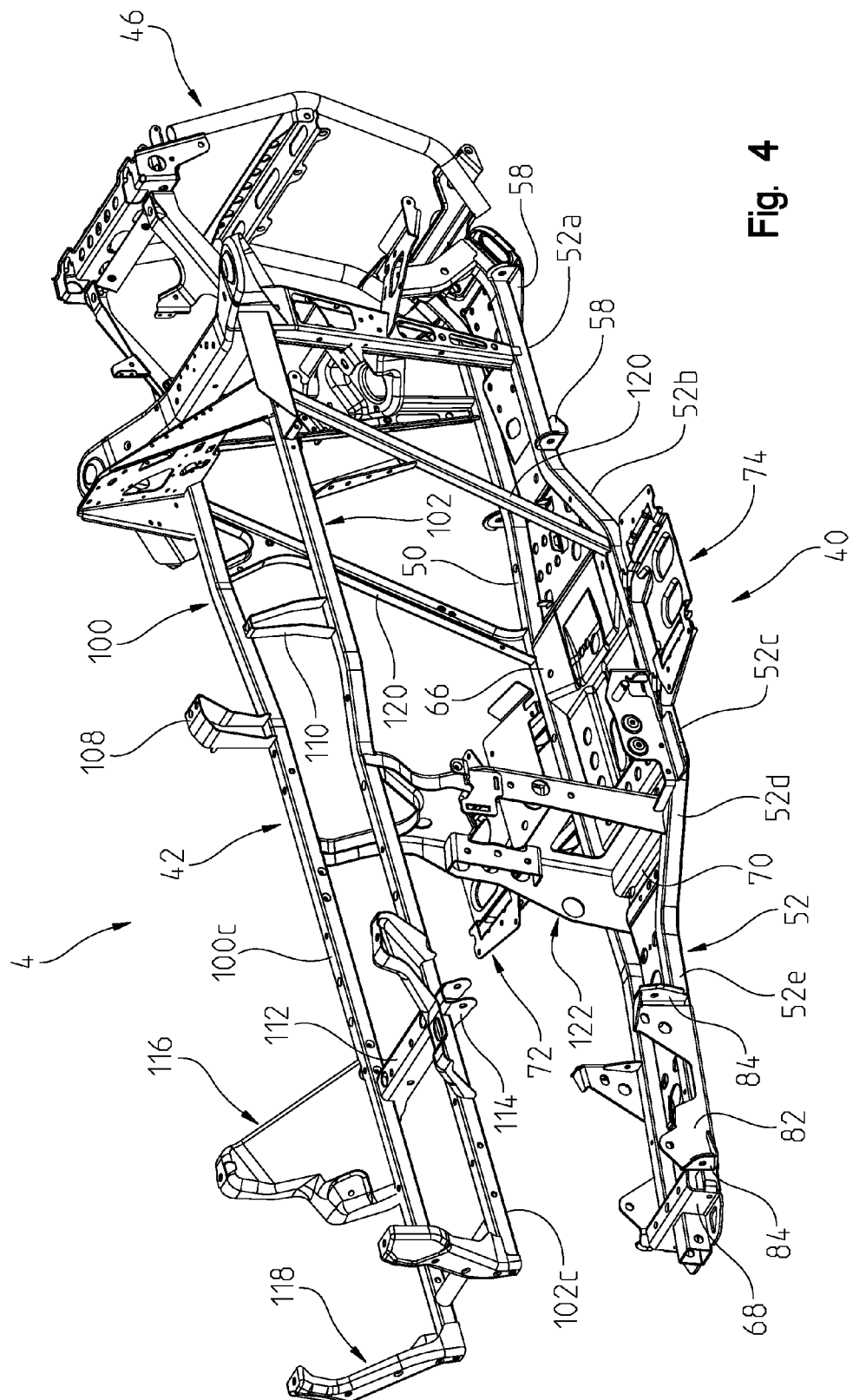
FIG. 4 is a right rear perspective view of the frame of FIG. 3.
Figure 5:
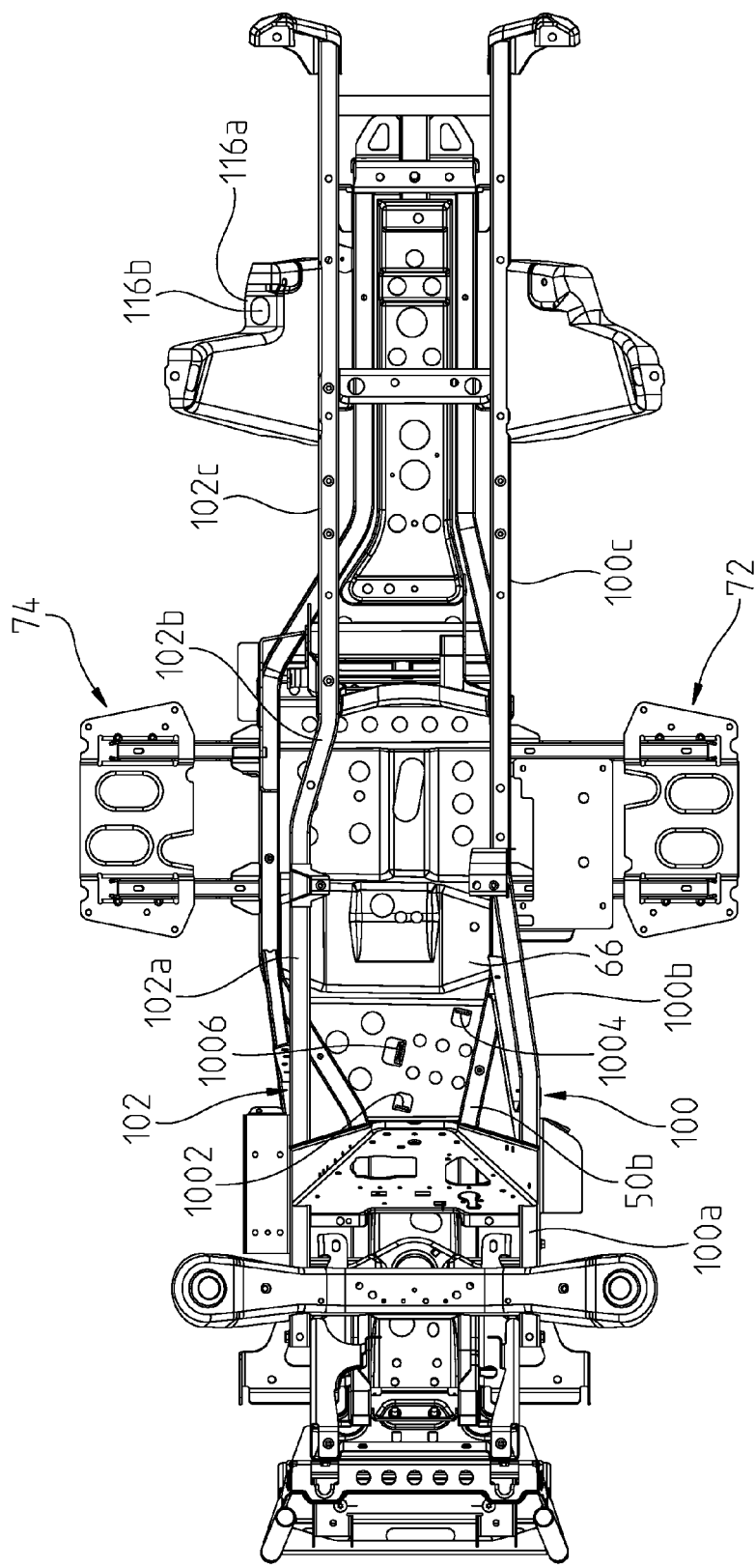
FIG. 5 is a top view of the frame of FIGS. 3 and 4.
Figure 6:
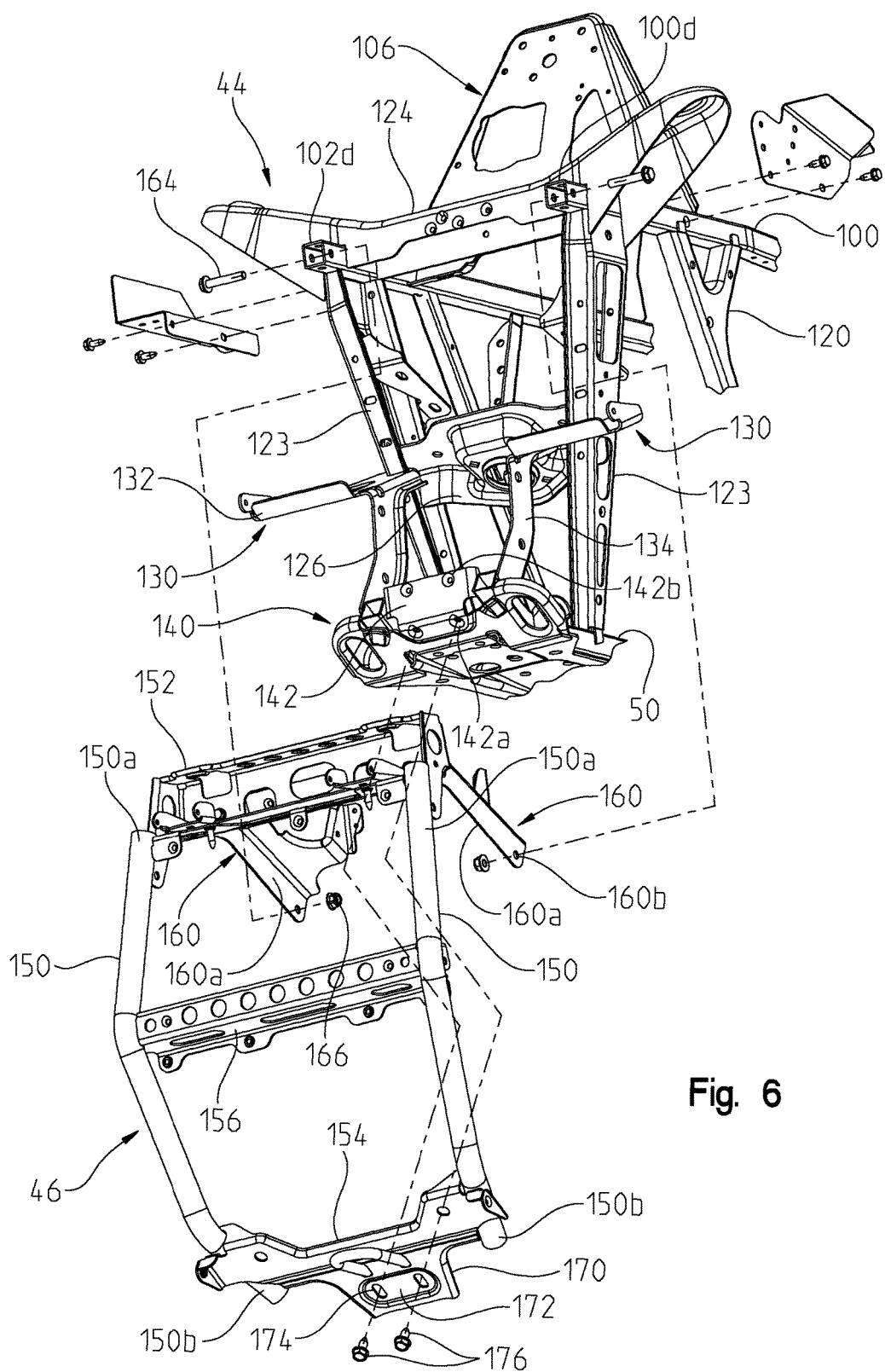
FIG. 6 is a front left perspective view of a portion of the frame.

With reference now to FIGS. 3-6, frame 4 will be described in greater detail. As shown in FIGS. 3-6, frame 4 includes a lower frame portion 40, upper frame portion 42, front frame portion 44, and removable frame portion 46 (FIG. 6). Lower frame portion 40 includes a longitudinally extending rail 50 coupled to longitudinally extending rail 52. Rail 50 includes a front portion 50a, transition portion 50b, center section 50c, transition section 50d, and rear portion 50e. Similarly, and with reference to FIG. 4, rail 52 includes front portion 52a, transition portion 52b, center portion 52c, transition portion 52*d*, and rear portion 52*e*. As shown, front suspension brackets 56 (FIG. 3) are coupled to rail portion 50*a* and front suspension brackets 58 (FIG. 4) are coupled to front rail portion 52*a*. Skid plates 60, 62, and 64 are coupled to and span longitudinally extending rails 50 and 52. Engine mount plate 66 (FIG. 4) also spans and is coupled to longitudinally extending rails 50, 52. A plurality of channels such as 68 and 70 (FIG. 4) may also couple longitudinally extending rails 50, 52. A left foot rest support 72 (FIG. 3) is coupled to rail 50, and a right foot support 74 (FIG. 4) is coupled to rail 52. As shown in FIG. 3, a left rear suspension bracket 78 includes mounting brackets 80, while a right rear suspension bracket 82 (FIG. 4) includes mounting brackets 84.

With reference still to FIG. 3, upper frame portion 42 includes a left longitudinally extending rail 100 and a right longitudinally extending rail 102. As best shown in FIG. 5, left longitudinally extending rail 100 includes a front portion 100*a* having a transition section at 100*b*, which leads into rear portion 100*c*. Right longitudinally extending rail 102 includes a forward portion 102*a*, having a transition section 102*b* leading into rear portion 102*c*. As shown best in FIG. 3, front bracket 106 extends upwardly from, and couples together, rails 100, 102. Rail 100 includes an intermediate bracket 108 and rail 102 includes an intermediate bracket 110. A rear shock mount 112 is coupled to and spans rear rail portions 100*c*, 102*c*, and includes a mounting bracket 114. A pair of brackets 116, 118 is also coupled to longitudinally extending rails 100, 102, for mounting rear rack 24. Frame 4 includes upright rails 120 coupling lower (40) and upper (42) frame portions together as best shown in FIG. 4. Frame 4 further includes a vertically extending support member 122 spanning between lower rails 50, 52 and upper rails 100, 102 as further described herein.

Figure 7:
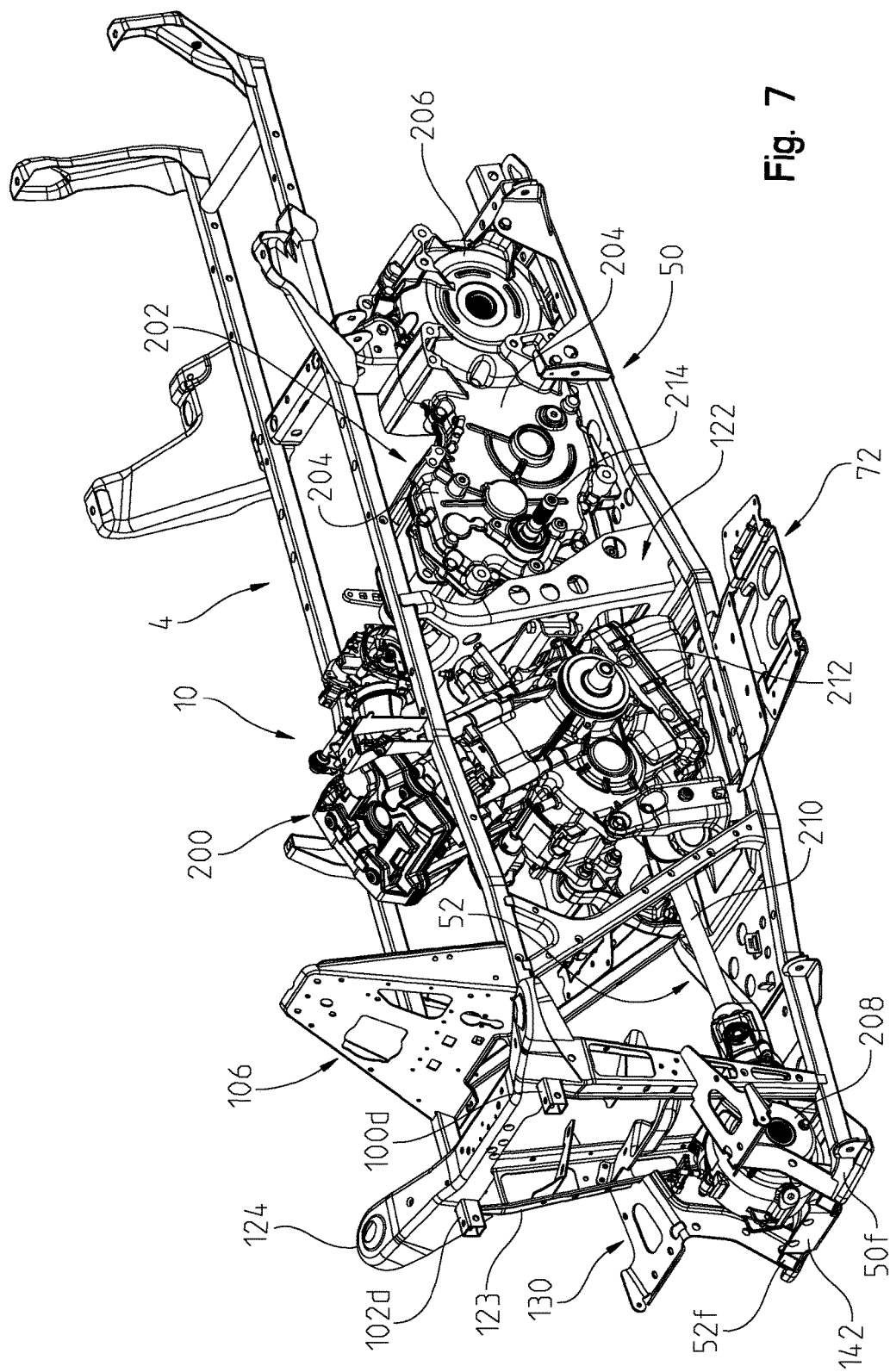
FIG. 7 is a front left perspective view showing the power train of the present application positioned in the frame.
Figure 8:
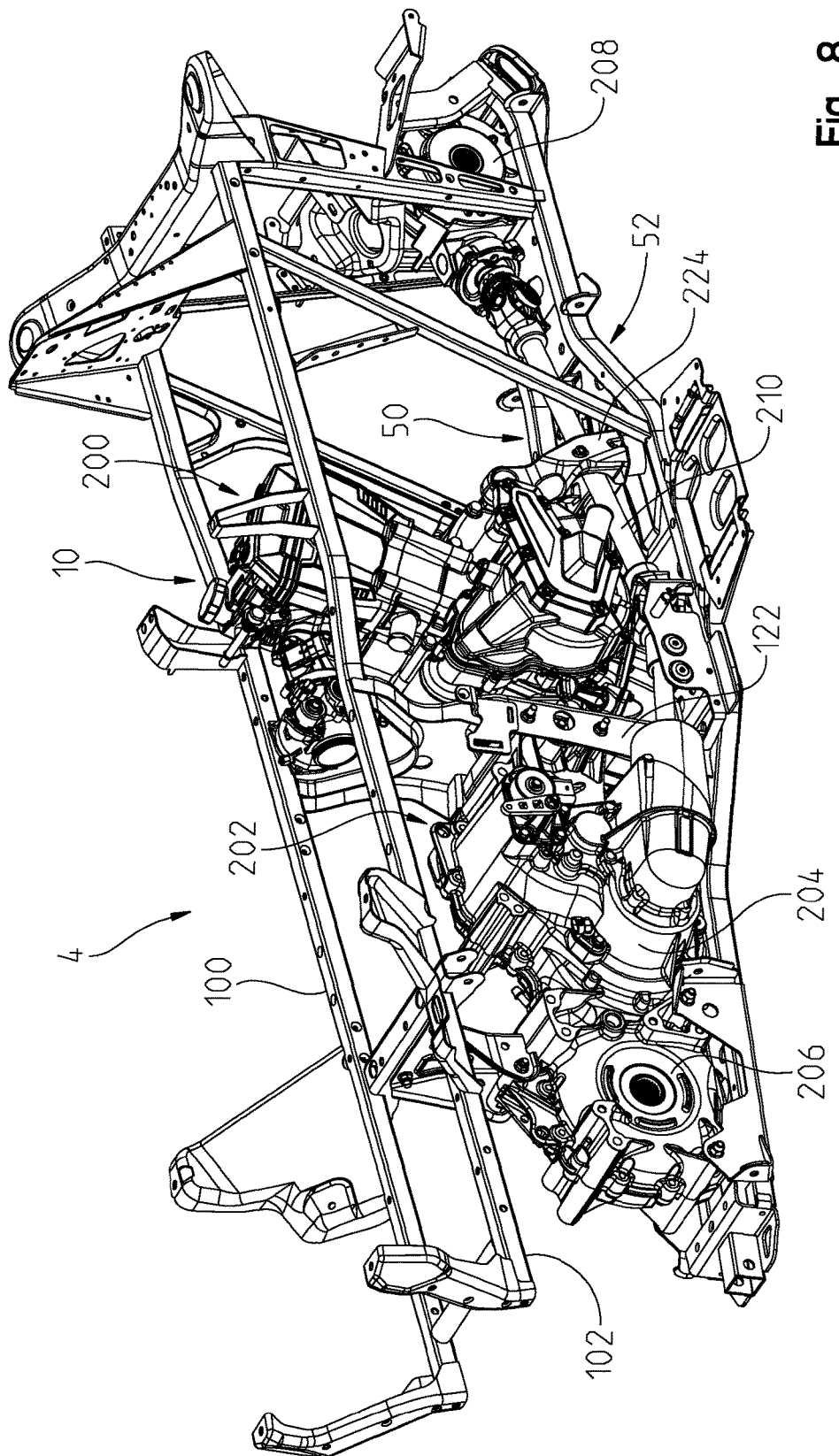
FIG. 8 is a right rear perspective view of the frame and power train of FIG. 7.

With reference now to FIG. 6, front frame portion 44 includes vertical uprights 123, which support a shock tower 124 and support plate 126. Front frame portion 44 further includes radiator mount brackets 130 including an upper support plate 132 and downwardly extending support legs 134. Support plates 132 are coupled to vertical uprights 123 and legs 134 are coupled to upwardly projecting portions 50*f*, 52*f* of rails 50, 52, respectively, as best shown in FIG. 7. Front frame portion 44 further includes lower support plate 140 coupled between rails 50, 52, which includes a front mounting bracket 142 having mounting apertures 142*a*, 142*b*.

With reference still to FIG. 6, removable portion 46 includes vertical uprights 150 having an upper end 150*a* coupled to cross-bracket 152, and lower ends 150*b* coupled to cross-bracket 154. A central cross-bracket 156 also couples upright members 150. Cross-bracket 152 includes rearwardly extending bracket arms 160 having plate portions 160*a* with apertures 160*b*, which couple with forward ends 100*d*, 102*d* of upper rails 100, 102, by way of fasteners 164, 166. Lower cross bracket 154 includes a lower plate portion 170 having an embossment at 172 including openings 174. Embossment 172 fits against mounting bracket 142 and fasteners 176 are receivable through opening 174 and are threadably received in threaded apertures 142*a*.

With reference now to FIGS. 7-11, power train 10 is shown as coupled to frame 4. As shown, power train 10 is comprised of an engine 200, a rear drive assembly 202, which includes transmission 204 and rear final drive 206. Power train 10 further includes a front final drive 208 coupled to rear drive assembly 202 by way of drive shaft 210, as described further herein. Engine could include various aspects of the engines shown in U.S. patent application Ser. No. 12/928,498 filed Dec. 13, 2010, and Ser. No. 13/242,229 filed Sep. 23, 2011, the subject of which is incorporated herein by reference. As shown in FIG. 7, power train 10 does not show the continuously variable transmission (CVT), which couples together engine output shaft 212 and input shaft 214 of transmission 204 as described herein in greater detail. It should be understood that engine output shaft 212 is the drive end of a crankshaft, where the crankshaft is oriented horizontally and transverse to a longitudinal axis of the vehicle.

Figure 9:
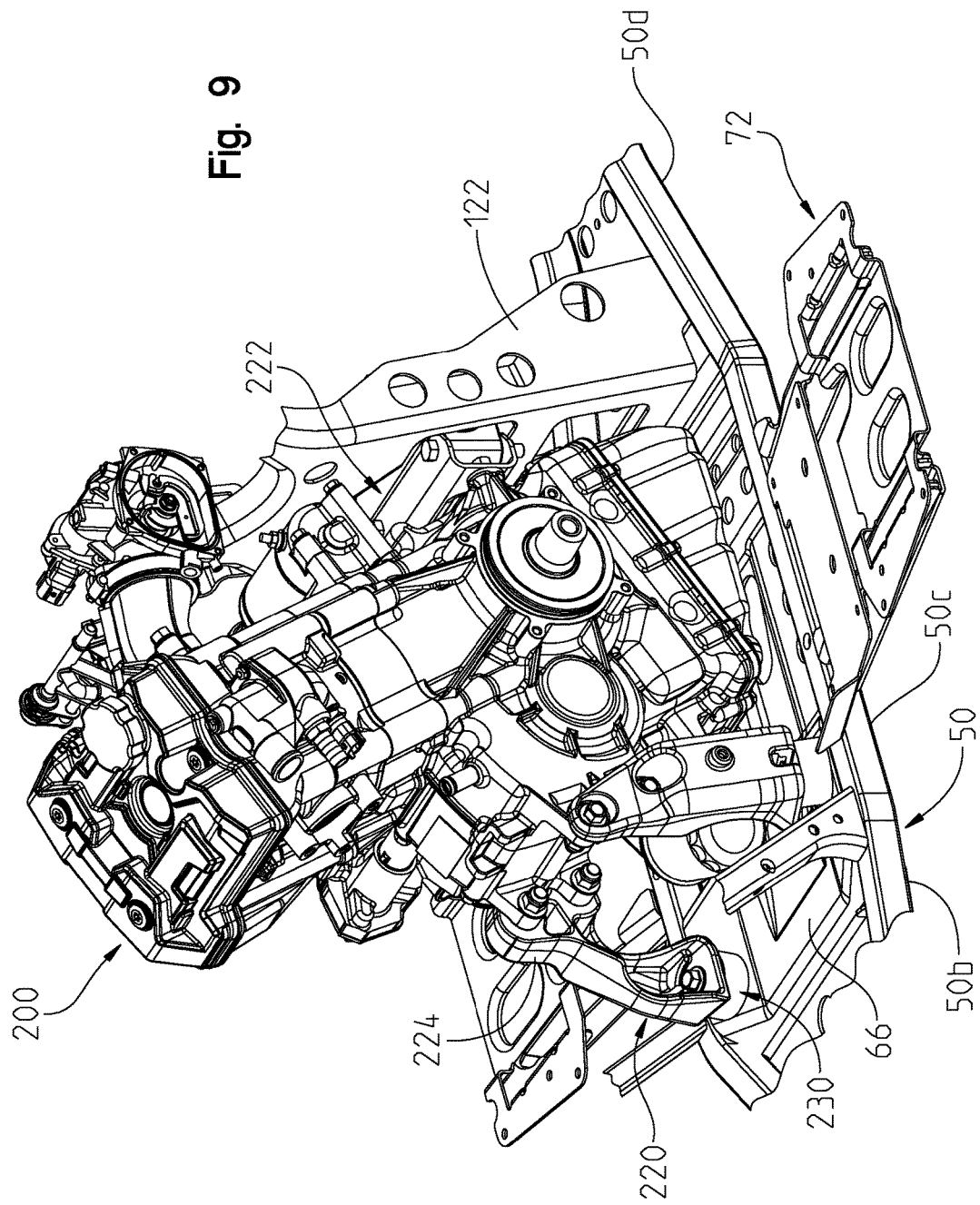
FIG. 9 is a front left perspective view showing the engine positioned in the frame.
Figure 10:
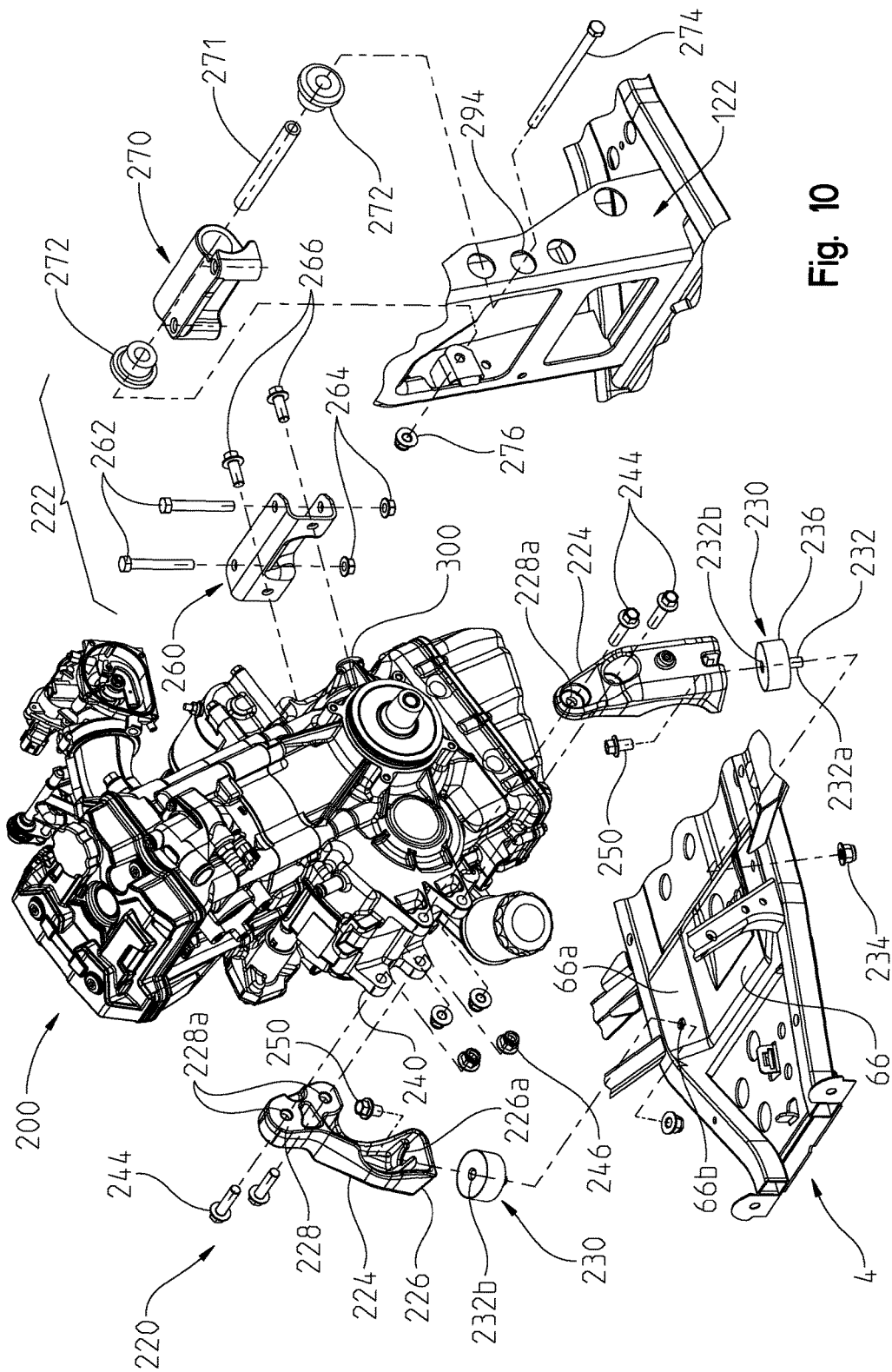
FIG. 10 is a view similar to that of FIG. 9 shown in an exploded manner.

With respect now to FIGS. 7-11, the mounting of engine 200 to frame 4 will be described in greater detail. As shown in FIG. 9, engine 200 is coupled to engine mount plate 66 by way of front bracket assembly 220 and rear bracket assembly 222. As shown in FIG. 10, front bracket assembly 220 includes upstanding support legs or brackets 224, which may be die cast, having a lower mounting surface at 226 and an upper flange 228 having mounting apertures 228*a*. An isolation mount 230 is provided having an integrated threaded insert 232 having a male threaded end at 232*a* and a female threaded end at 232*b*. Engine mount plate 66 includes angled plate surfaces 66*a* having apertures 66*b*, which receive threaded portion 232*a* therethrough, which can be coupled by way of fastener 234. It should be appreciated that isolation mount 230 further includes a resilient grommet portion 236, which is positioned against plate portion 66*a*. As shown in FIG. 10, engine 200 includes integral flanges 240, which are profiled to conform with flanges 228 of bracket 224 whereby fasteners 244 may be received through apertures 228*a* and through flanges 240, to receive fasteners 246 retaining engine to bracket 224. It should also be appreciated that bracket 224 may be placed upon isolation mount 230 and fastener 250 may be received through aperture 226*a* of bracket 224 and into threaded insert portion 232*b* of isolation mount 230. Brackets 224 and engine 200 are shown in their coupled state in FIG. 9.

Figure 10A:
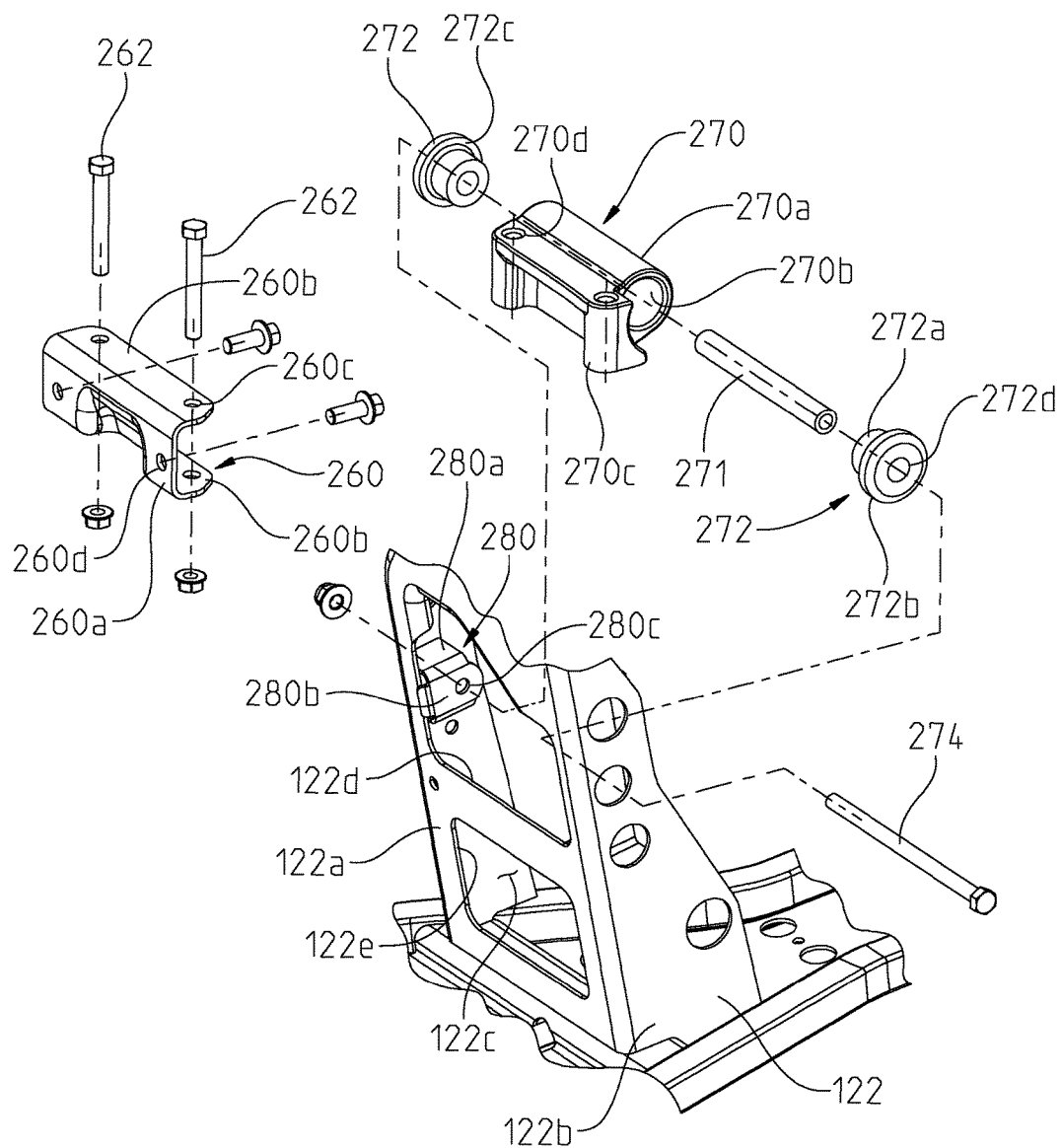
FIG. 10A shows an enlarged view of a portion of FIG. 10.

With reference still to FIG. 10, rear bracket assembly 222 generally includes bracket 260, fasteners 262, 264; fasteners 266; bracket 270; sleeve 271; isolation bushings 272; and fasteners 274, 276. As best shown in FIG. 10A, bracket 260 includes a front plate portion 260*a* and upper and lower plate portions 260*b*. Plate portions 260*b* include apertures 260*c* and plate portion 260*a* includes apertures 260*d*. Bracket 270 includes a cylindrical portion 270*a* having an internal diameter at 270*b*. Two integral bosses 270*c* extend transversely of cylindrical portion 270*a* and include apertures at 270*d*. Bushings 272 include an outer diameter portion 272*a* profiled to be received within diameter portion 270*b* and an outer annular portion 272*b* having an inner face 272*c*. Bushings 272 further include openings at 272*d* profiled to receive sleeve 271.

Figure 11:
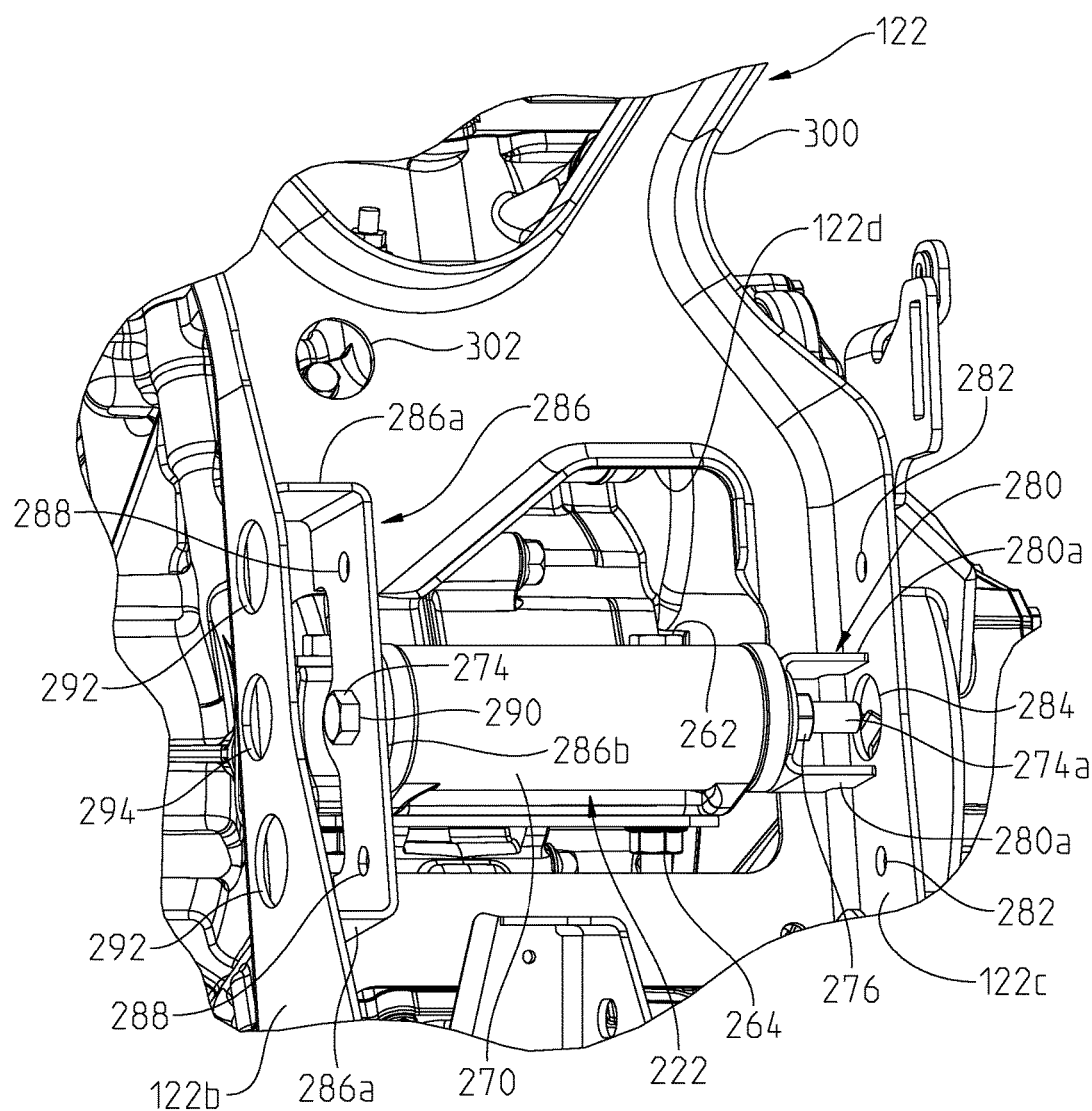
FIG. 11 shows an enlarged view of a rear left perspective view of the engine mount.

With reference now to FIGS. 10A and 11, vertically extending member 122 generally includes a front wall 122*a* and sidewalls 122*b*, 122*c*. Front wall portion 122*a* includes an upper window at 122*d* and a lower window at 122*e*. Sidewall 122*c* includes bracket 280 having upper and lower walls 280*a*, and an inwardly facing wall 280*b* having an aperture at 280*c*. As shown in FIG. 11, sidewall 122*c* further includes upper and lower apertures 282 and central aperture 284 coaxially aligned with aperture 280*c* (FIG. 10A). With reference again to FIG. 11, side wall 122*b* includes bracket member 286 having upper and lower wall 286*a* and an inner wall at 286*b*. Inner wall 286*b* includes upper and lower apertures 288 and a central aperture 290 (through which fastener 274 extends). Side wall 122*b* includes upper and lower apertures 292 coaxially aligned with apertures 288 and a central opening 294 coaxially aligned with aperture 290. Thus the attachment of engine 200 to frame 4 by way of bracket assembly 222 will now be described.

As shown in FIGS. 10 and 10A, bracket 260 is coupled to bosses 300 (FIG. 10) on a rear side of engine 200 and is coupled in place by fasteners 266 projecting through apertures 260d (FIG. 10A). Resilient bushings 272 are positioned in cylindrical portion 270a with sleeve 271 positioned through openings 272d of bushings 272. This assembly is positioned through window 122d of vertical extending support member 122 and fastener 274 (FIG. 10) may be positioned through opening 294 into aperture 290 (FIG. 11) and through sleeve 271. A threaded end 274a (FIG. 11) of fastener 274 projects through aperture 280c of bracket 280 (FIG. 11) and fastener 276 couples with threaded end 274a of fastener 274. As should be appreciated, apertures 294 and 284 may be used for socket wrenches, which engage fasteners 274, 276 to draw the two fasteners together. Fasteners 262 and 264, maintain brackets 260, 270 together extending through apertures 260c and 270d (FIG. 10A).

With reference still to FIG. 11, vertically extending support member 122 further includes on a right side thereof, an indentation or notch 300, which provides clearance for an exhaust system, as further described herein. Vertically extending support member 122 also includes an access opening 302 for an engine mounting bolt.

Figure 12:
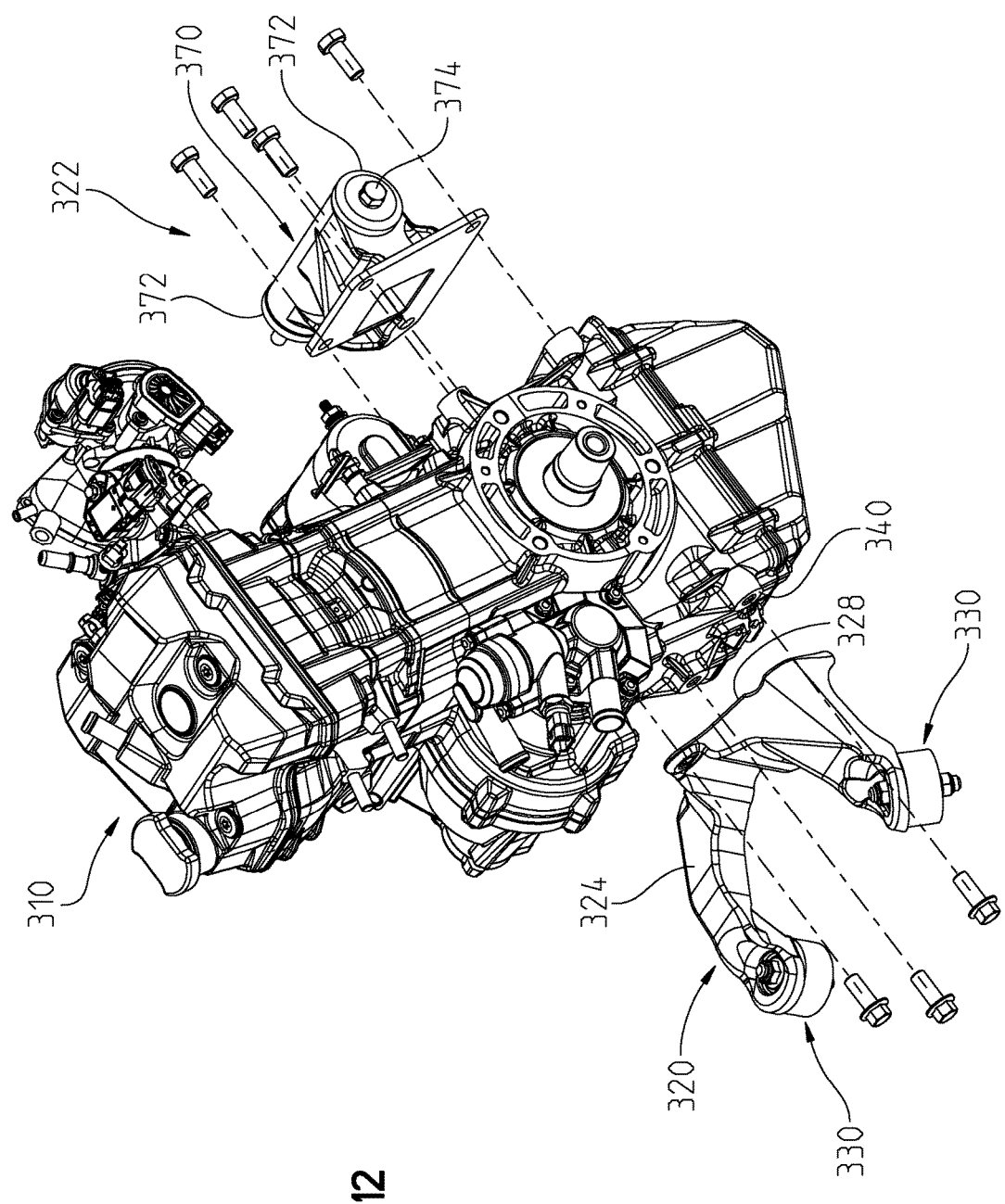
FIG. 12 shows an alternate engine and mounting structure.

With reference now to FIG. 12, the above-described frame 4 and vertically-extending support member 122, also accommodates an alternate engine 310 having front bracket assembly 320 and rear bracket assembly 322. Assembly 320 includes bracket 324 having an upper flange 328 for mounting to a front of engine 310 and resilient bushings 330 substantially similar to bushings 230 as described above. Rear bracket assembly 322 includes a cylindrical portion 370 having resilient bushings 372 and fastener 374, which operate in a substantially similar way as described above with reference to rear bracket assembly 222. Front bracket assembly 320 and rear bracket assembly 322 mount to frame in an identical manner as that described above, that is to engine mount plate 66, and to vertically-extending support member 122.

Figure 13:
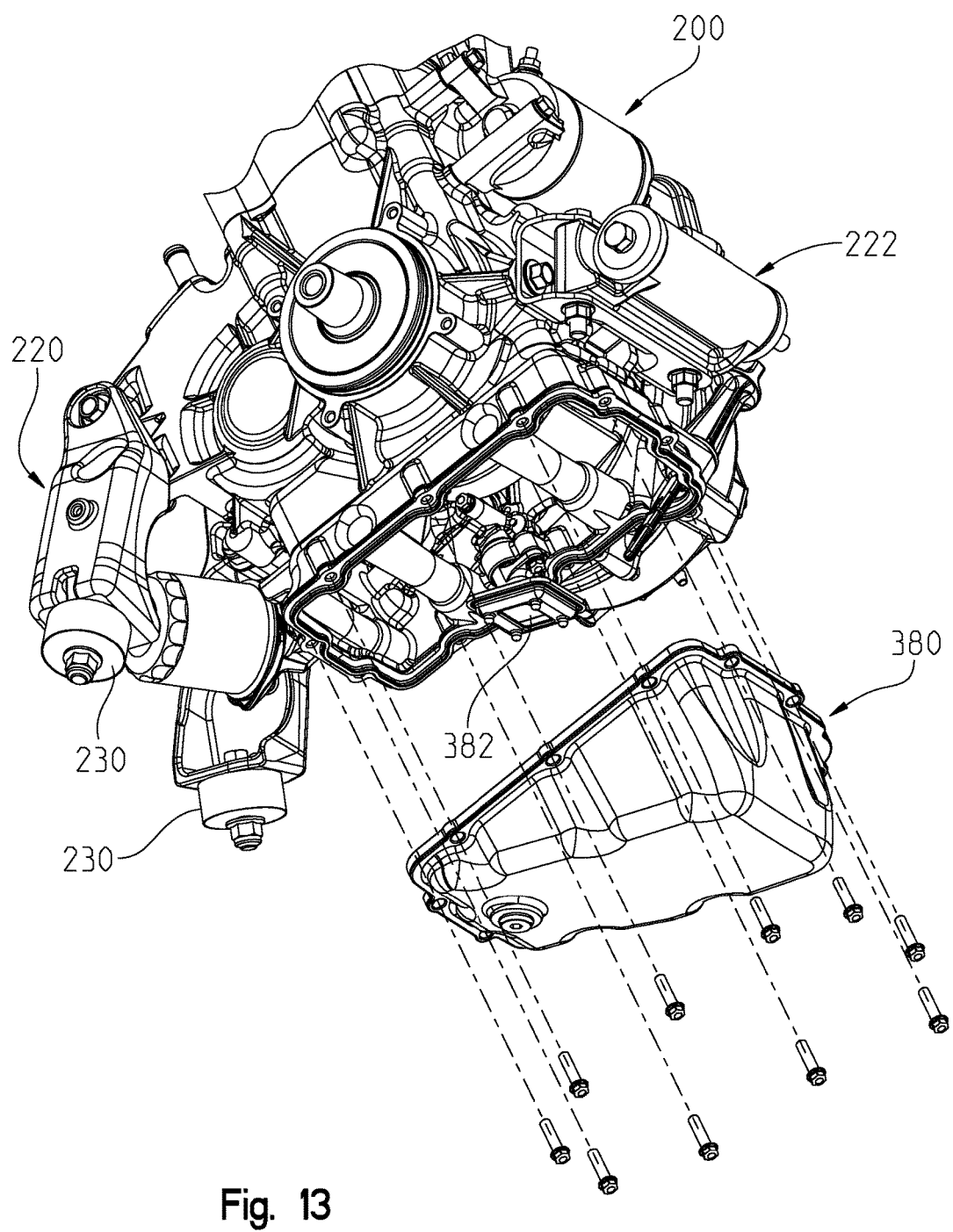
FIG. 13 shows the engine of FIG. 9 with the oil pan exploded away.

With reference now to FIG. 13, engine 200 is shown with oil pan 380 removed. It should be appreciated that engine 200 is a wet sump type engine, meaning that the oil supply is retained within oil pan 380. Snorkel 382 generally extends downwardly into the pan 380 to accommodate the tipped forward aspect of the engine orientation.

Figure 14:
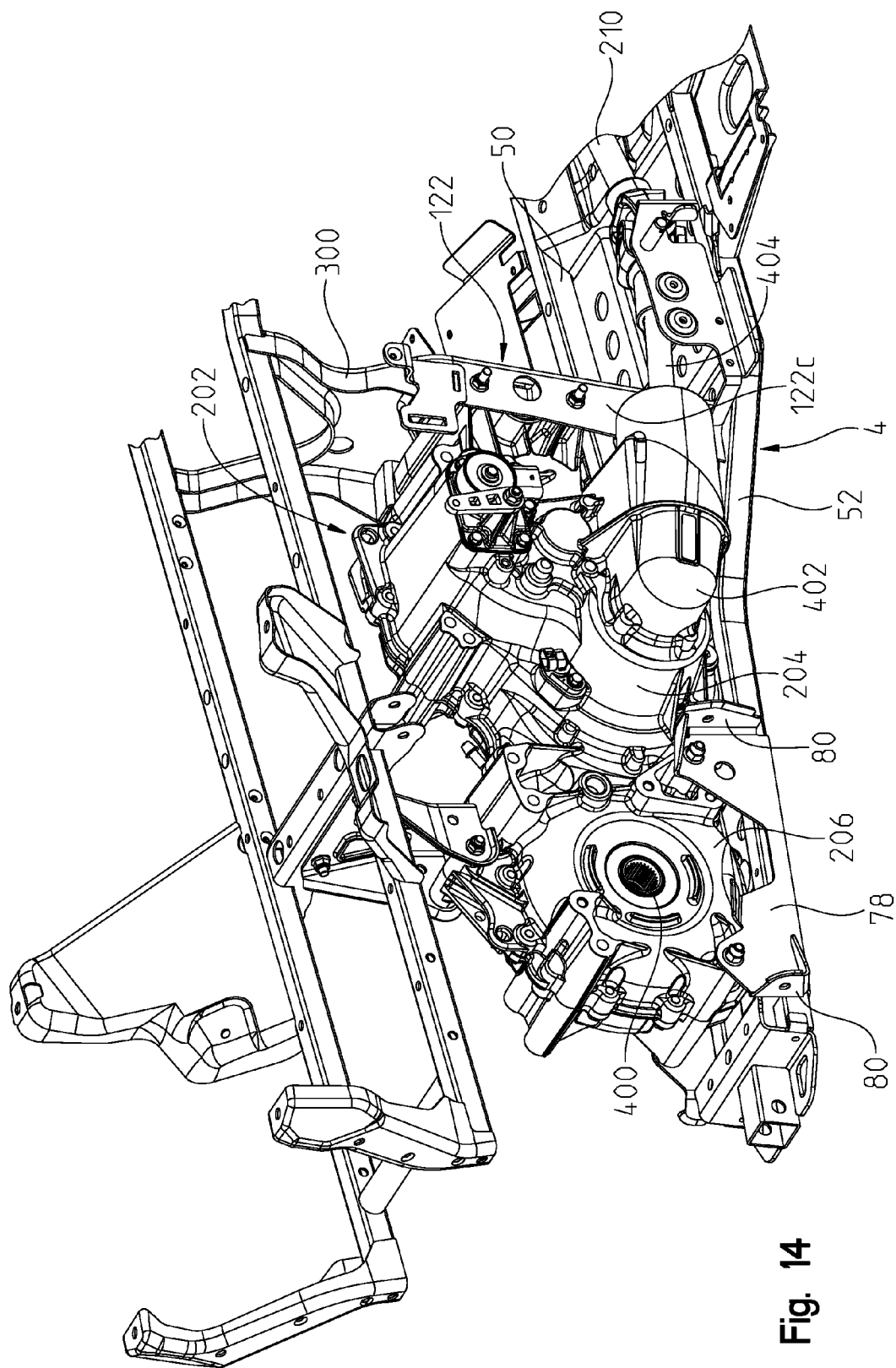
FIG. 14 is a right rear perspective view of the transmission and final drive assembly positioned in the frame.
Figure 15:
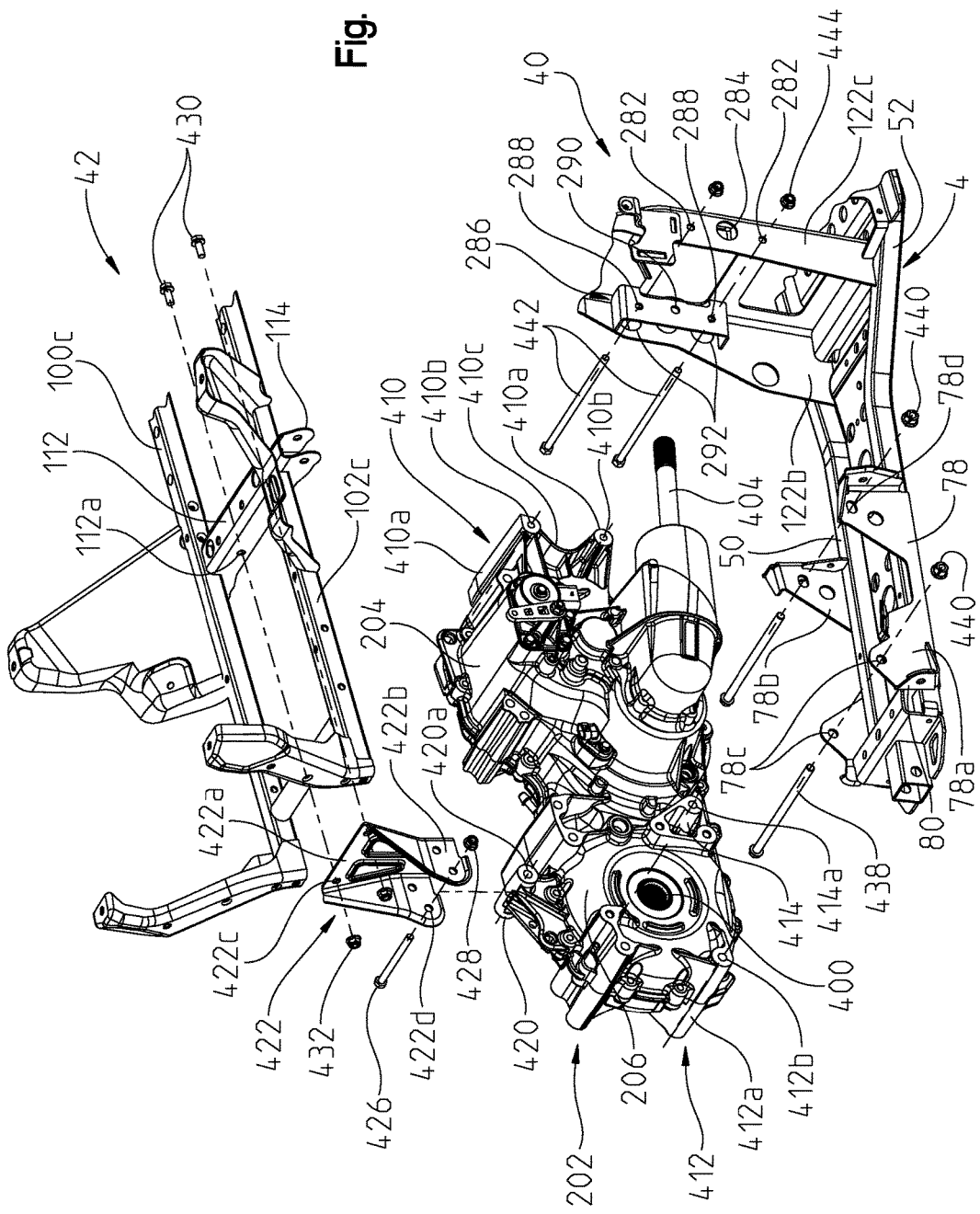
FIG. 15 is a view similar to that of FIG. 14 showing the transmission and final drive assembly exploded away from the frame.

With reference now to FIGS. 14 and 15, the coupling of rear drive assembly 202 to frame 4 will be described in greater detail. As shown, rear drive assembly 202 includes input shaft 214 (FIG. 7) and has rear output 400 at rear final drive 206 and a front drive assembly 402 (FIG. 14) having a front drive shaft 404. As shown, transmission 204 includes a front integrated bracket 410 (FIG. 15), having transverse bosses 410a and apertures 410b. A U-shaped cutout 410c is provided which extends rearwardly as described herein. Rear final drive 206 includes a rear bracket 412, having a transverse boss 412a with aperture 412b. Boss 414 is also provided, having an aperture at 414a. As shown best in FIG. 15, rear bracket 78 includes upstanding bracket arms 78a and 78b, having mounting apertures at 78c and 78d respectively. Rear final drive 206 also includes an upper transversely extending boss 420, having aperture 420a. A bracket 422 is provided, having a front plate portion 422a, side plates 422b, mounting apertures 422c and 422d.

Thus, mounting rear drive assembly 202 first includes coupling bracket 422 to rear final drive 206 by attaching bracket 422 to transverse boss 420. It should be appreciated that a fastener 426 may be positioned through apertures 422d of bracket 422 and through aperture 420a of boss 420. A counter fastener 428 couples with fastener 426 to affix bracket 422 to final drive 206. Rear drive assembly 202 is now coupled to the lower and upper frame portions 40, 42, as described herein. As shown in FIG. 15, rear final drive 202 is positioned with bracket 422 adjacent to cross-member 112; rear final drive 206 adjacent to rear bracket 78; and with a front of transmission 204 adjacent to vertically-extending support member 122. Apertures 422c of bracket 422 are now aligned with apertures 112a and fasteners 430, 432, may be applied to couple rear final drive 206 to upper frame portion 42. Apertures 412b and 414a of final drive 206 are also positioned adjacent to apertures 78c and 78d of bracket 78, respectively and the fasteners 438, 440 may be utilized to couple rear final drive 206 to rear bracket 78. Finally, bosses 410 of transmission 204 are positioned between bracket 286 and side wall 122c of vertically-extending support member 122. More particularly, apertures 410b are aligned with apertures 288 and 282 and fasteners 442 extend through apertures 288, 292 and 282, and couple with fasteners 444 to retain front bracket 410 of transmission 204 to vertically-extending support member 122.

It should be appreciated that bracket 410, when coupled to bracket 286, is coupled to the same bracket as rear bracket assembly 222 for engine 200 (see FIG. 11). Furthermore, cut-out 410c is profiled to overlap cylindrical portion 270 of rear bracket assembly 222. As mounted, front drive assembly 402 is positioned laterally outside of vertically-extending support member 122 and in particular, side plate 122c with drive shaft 404 spanning side plate 122c. FIG. 14 also shows drive shaft 404 coupling with front drive shaft 210 and front drive shaft 210 extends inside of engine bracket 224 (FIG. 8), such that bracket 224 straddles drive shaft 210. Furthermore, window 122e allows airflow from a front side of the vertically extending support member 122, through to a rear side of the vertically extending support member 122, cooling engine 200 and allowing removal of heat from the operator's area.

Figure 16:
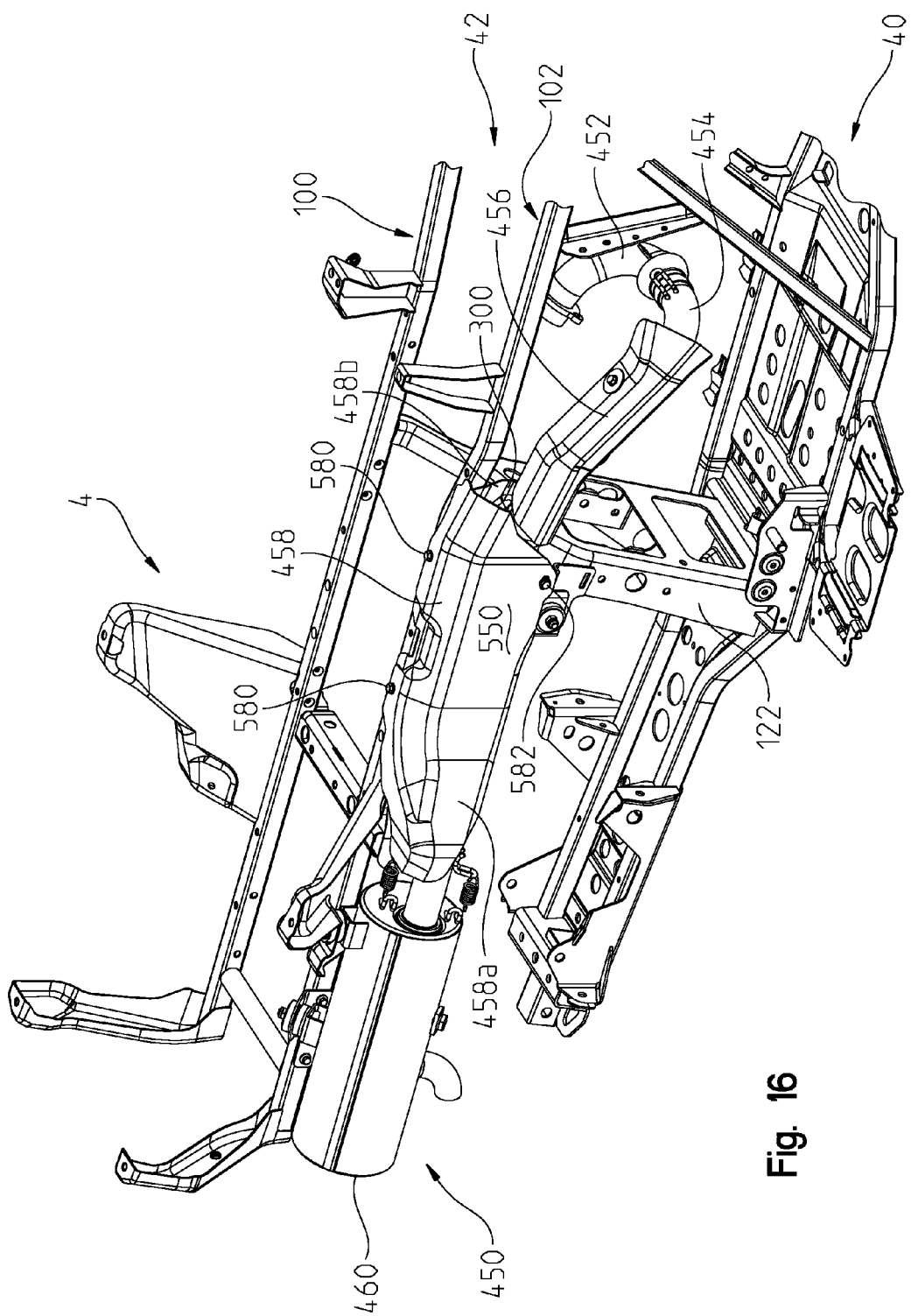
FIG. 16 shows a front right perspective view of the engine exhaust system coupled to the frame.
Figure 17:
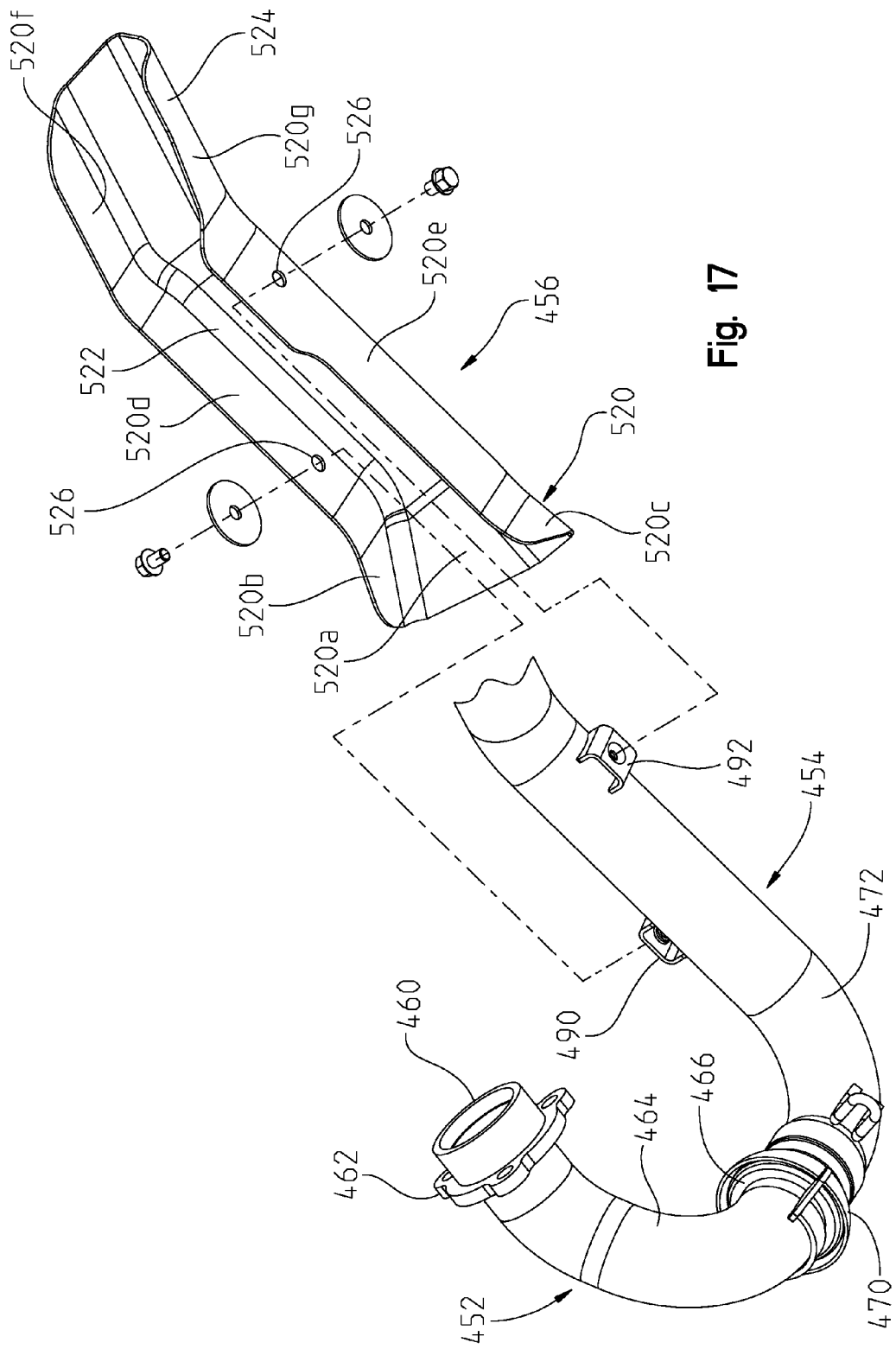
FIG. 17 is an underside perspective view showing a shield of the exhaust system exploded away from the exhaust tube.
Figure 18:
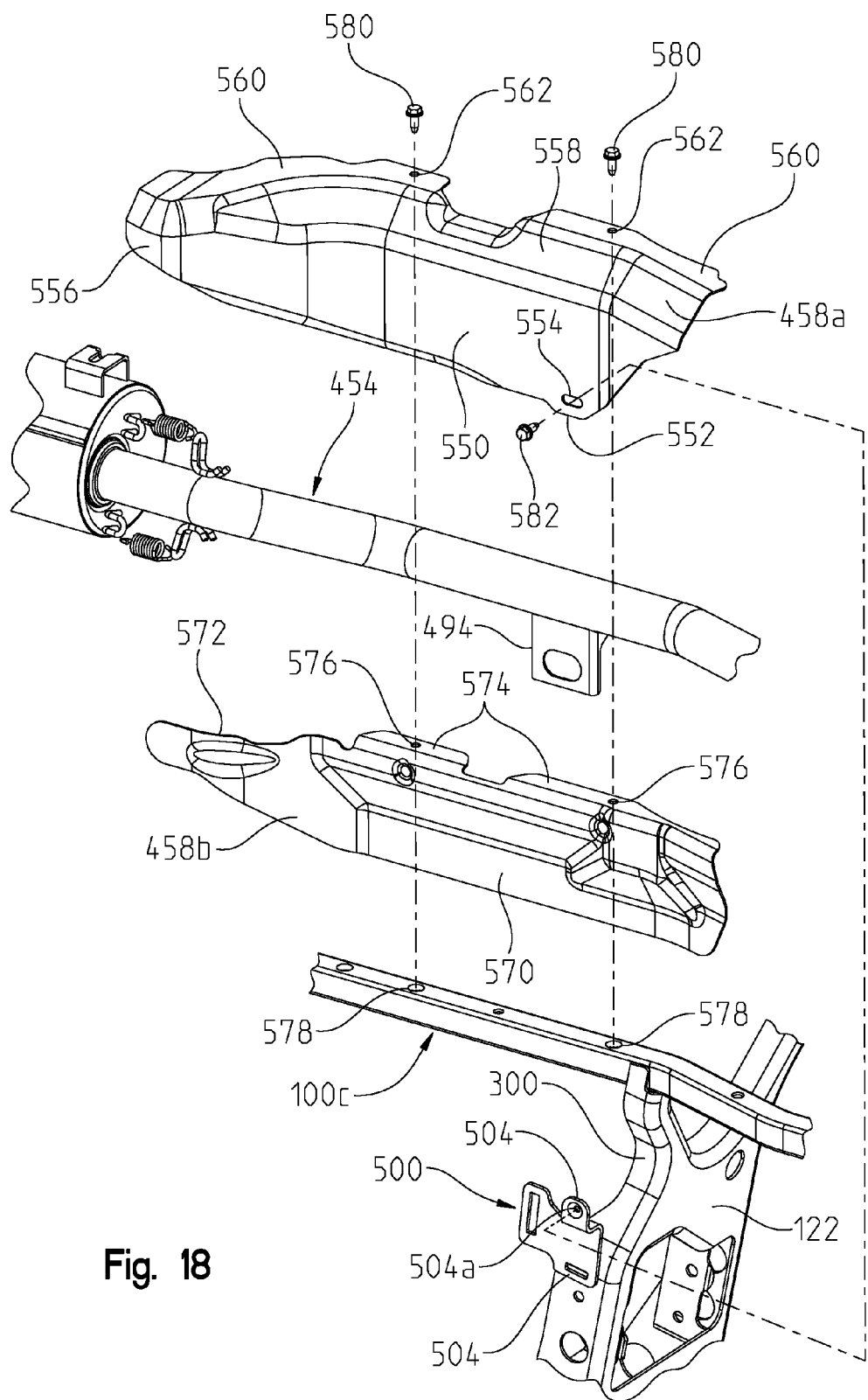
FIG. 18 shows a rear shield of the exhaust system exploded away from the exhaust tube.
Figure 19:
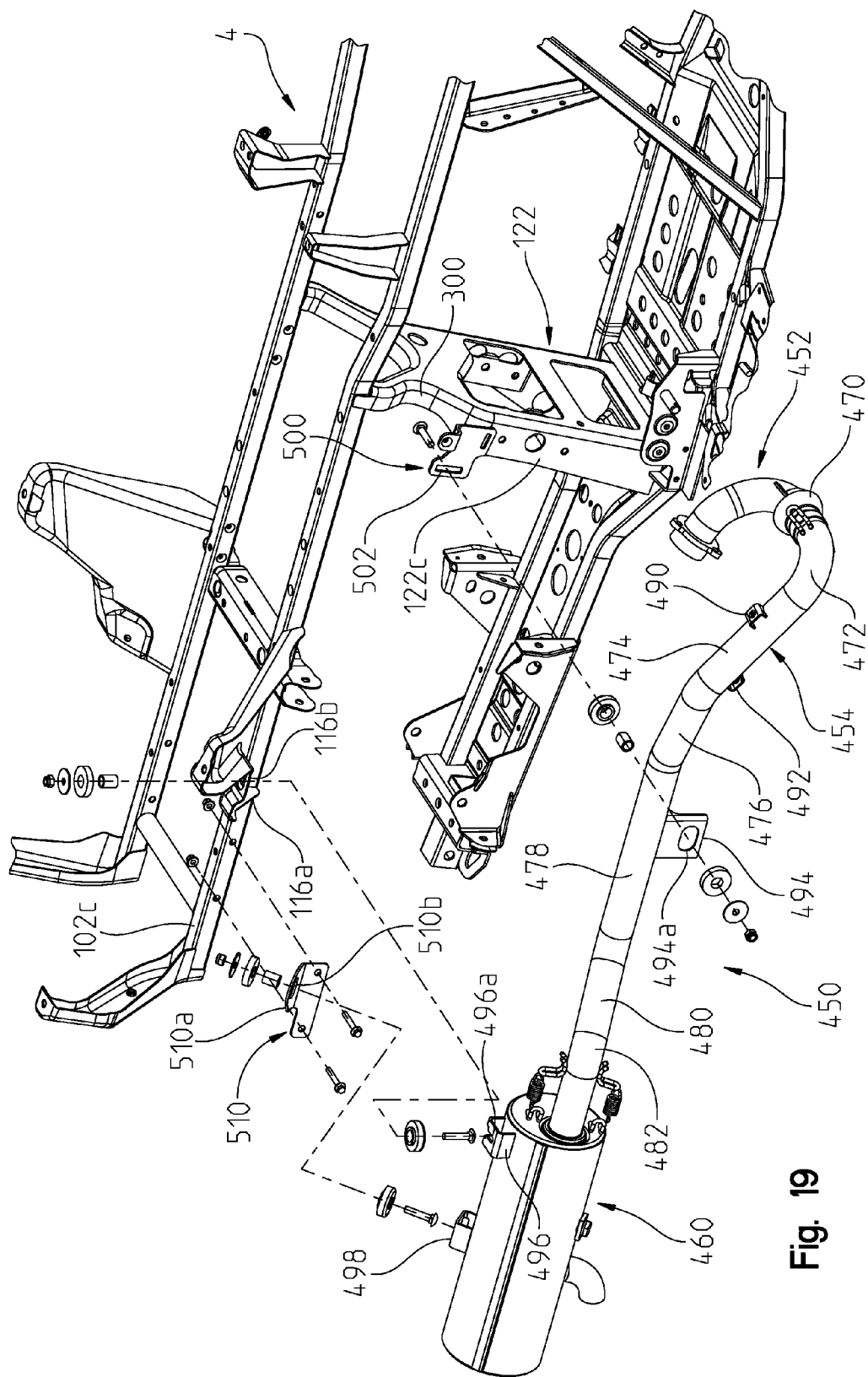
FIG. 19 shows the exhaust tube and muffler exploded away from the frame.

With reference now to FIGS. 16-20, an exhaust system 450 of the ATV 2 will be described. As best shown in FIG. 16, exhaust system 450 generally includes an exhaust manifold 452, exhaust tube 454, front shield 456, rear shield 458, and muffler 460. With reference now to FIG. 17, exhaust manifold 452 includes a first end 460 receivable within an exhaust port of engine 200 and a flange 462 for direct connection with engine 200. Exhaust manifold 452 also includes a bend at 464 and a coupling end at 466. As shown in FIG. 19, exhaust tube 454 includes a coupling 470 which couples with coupling 466 of manifold 452 which transitions into bend portion 472. Exhaust tube section 474 transitions from portion 472 and inclines upwardly and inwardly, towards a longitudinal centerline of frame 4. Portion 476 transitions from portion 474 and extends generally horizontally but continues transitioning inwardly towards frame 4 longitudinal center line. Portion 478 extends generally longitudinally and horizontally rearwardly to portion 480 which inclines outwardly away from longitudinal centerline of frame 4 and upwardly to transition section 482 and into muffler 460. With reference to FIGS. 17 and 19, exhaust tube 472 includes first and second brackets 490, 492, for mounting shield 456 as described herein. Exhaust tube 454 also includes bracket 494 coupled to portion 478 for coupling to frame 4 as described herein. Furthermore, muffler 460 includes brackets 496 and 498.

Frame 4 includes brackets for coupling of exhaust system 450 thereto. With reference to FIG. 19, vertically extending support member 122 includes a bracket 500 coupled to sidewall 122c having a slot at 502. Bracket 494 includes aperture 494a which can be positioned adjacent to slot 502. A plurality of fasteners (FIG. 19) retain flange 494 and exhaust tube 454 to bracket 500 and to frame 4.

With reference still to FIG. 19, bracket 510 is coupled to rail portion 102c by way of fasteners, and bracket 510 includes an angled plate portion 510a having a mounting aperture at 510b. Each of brackets 496 and 498 include mounting slots such as 496a and thus bracket 496 may be positioned adjacent to flange 116a and bracket 498 may be positioned adjacent to flange 510a and a plurality of fasteners may couple the muffler 460 to frame 4.

Figure 20:
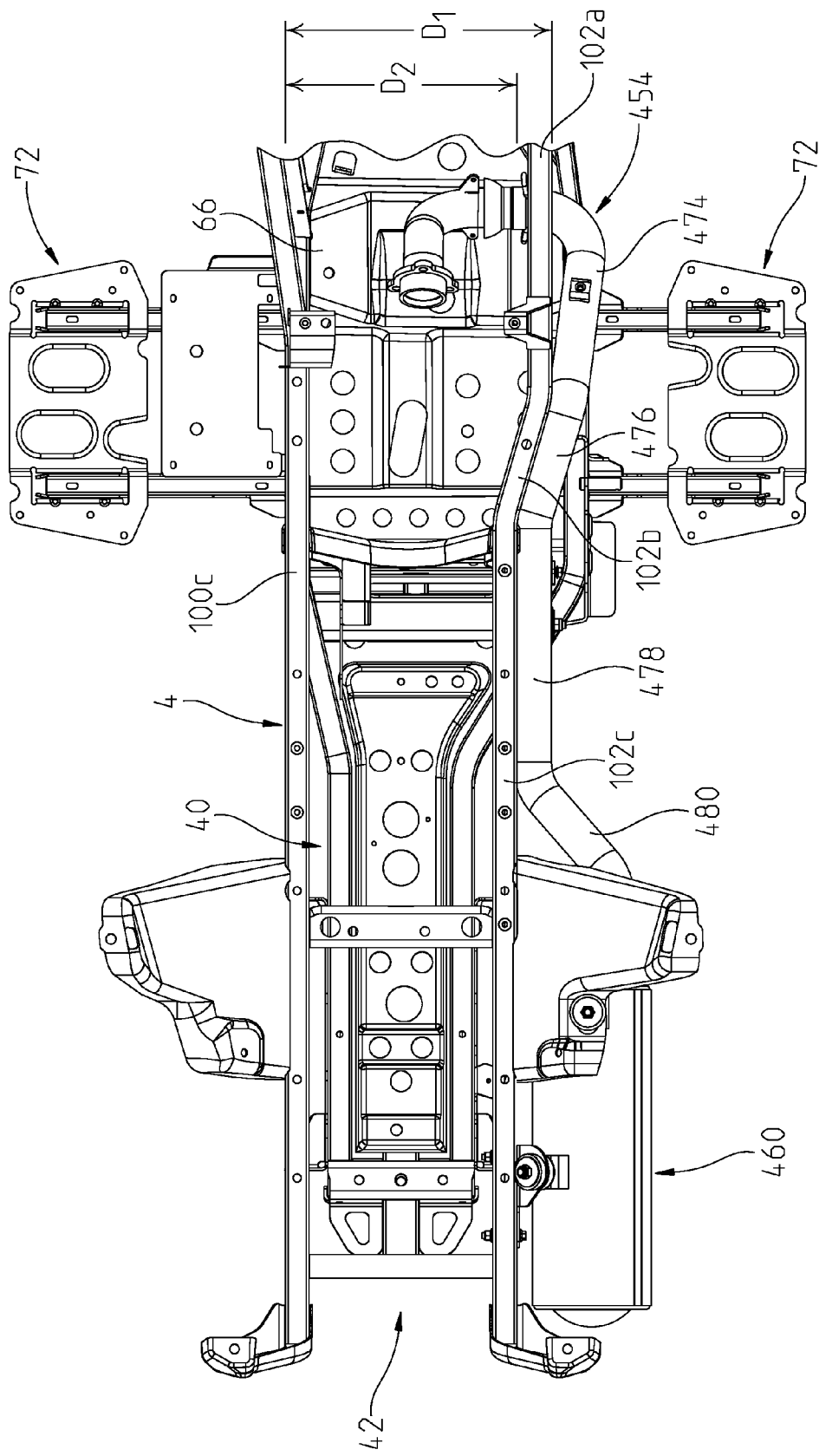
FIG. 20 shows a top view of the exhaust system as mounted to the frame.

Thus as shown in FIG. 20, ATV 2 has a frame 4 having lower longitudinally extending frame portion 40 and an upper longitudinally extending frame portion 42. The upper frame portion has longitudinally extending upper frame rails 100, 102, where at least one of the upper frame rails, in this case 102, has an inward transition 102b defining a first distance ($D_1$) between the upper frame rails 100c, 102a forward of the inward transition, and a second distance ($D_2$) rearward of the inward transition, where the first distance is greater than the second distance. The exhaust system comprises an exhaust tube 454 with an inwardly angled portion 476 at the inward transition 102b, with the exhaust tube 454 extending generally rearwardly at 478 along the upper frame rail portion 102c rearward of the inward transition 102b.

With reference now to FIG. 17, front shield 456 generally includes a front portion 520, a central portion 522, and a rear portion 524. Front portion 520 includes an outer wall 520a and angled walls 520b and 520c. Angled walls 520b and 520c transition into generally parallel walls 520d and 520e, respectively. Furthermore, walls 520d and 520e transition into walls 520f and 520g respectively. As shown, angled walls 520b and 520c flare outwardly while walls 520f and 520g are angled in the same direction. Each of walls 520d and 520e include an aperture at 526 which correspond with brackets 490, 492, such that fasteners may couple shield 456 to exhaust tube 454. Shield 456 is shown in a mounted position in FIG. 16.

With reference now to FIG. 18, rear shield 458 will be described in greater detail. As shown, shield 458 is comprised of a two piece shield including shield portion 458a and shield portion 458b. As shown, shield portion 458a includes a generally vertically extending plate 550 having a lower tab at 552 having an aperture at 554. Plate portion 550 extends rearwardly to form a transition portion at 556 to conform to exhaust tube 454. Shield portion 458a further includes a radius portion 558 transitioning into an upper wall portion at 560. Upper wall portion 560 includes mounting apertures at 562. As also shown in FIG. 18, shield portion 458b includes a plate portion 570 having a rear transition portion 572 conforming to exhaust tube 454 and upper tab portion 574 is reversely bent and includes mounting apertures 576 which correspond to mounting apertures 562. In this manner, shield portions 458a and 458b are positioned in a surrounding relation to exhaust tube 454 with upper wall portion 560 overlapping upper portion 574 with fasteners 580 projecting through apertures 562, 576, and into threaded engagement with threaded apertures 578 of rail portion 100c. A fastener 582 may also be positioned through aperture 554 and into threaded engagement with aperture 504a of tab 504.

The fully installed exhaust system 450 is shown in FIG. 16 with shield 456 coupled to exhaust tube 454. Shield portions 458a and 458b are also shown coupled to frame 4 in a totally overlapping relationship with exhaust tube 454.

The two piece arrangement of the shield 458 allows for a complete enclosure of the exhaust tube without a bend radius which could damage the formation of the shields. As installed, exhaust tube 454 tucks into notch 300 of vertically extending support 122. As shown best in FIG. 20, exhaust tube 454 conforms tightly to upper frame portion 42. More particularly, transition portion 474 of exhaust tube 454 raises exhaust tube portion 476 to be positioned adjacent to rail portion 102b, where it conforms closely to portion 102b, and exhaust tube portion 478 conforms closely to rail portion 102c. This provides a narrow overall vehicle for the rider to straddle.

Figure 21:
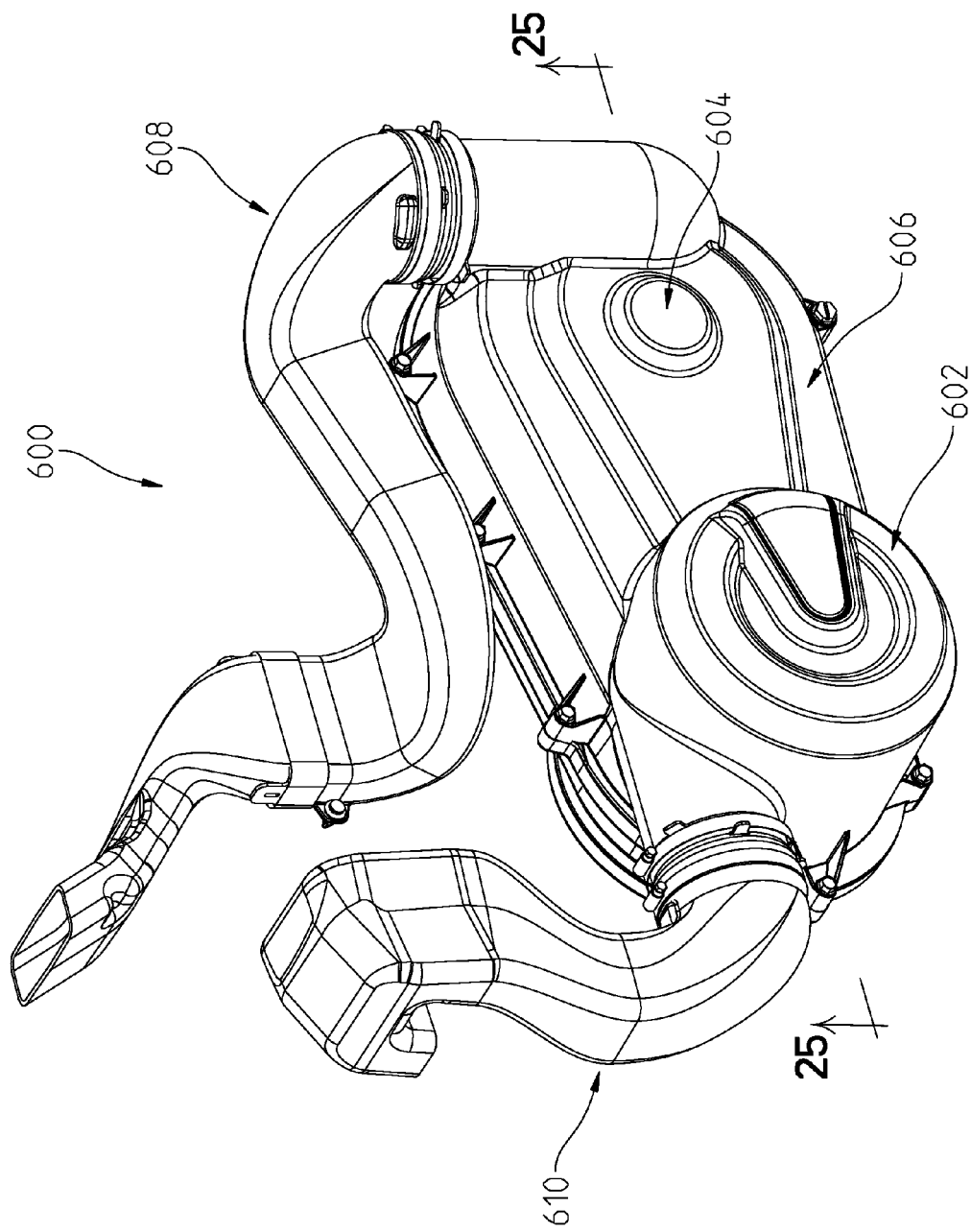
FIG. 21 shows a front left perspective view of the continuously variable transmission (CVT) assembly.
Figure 22:
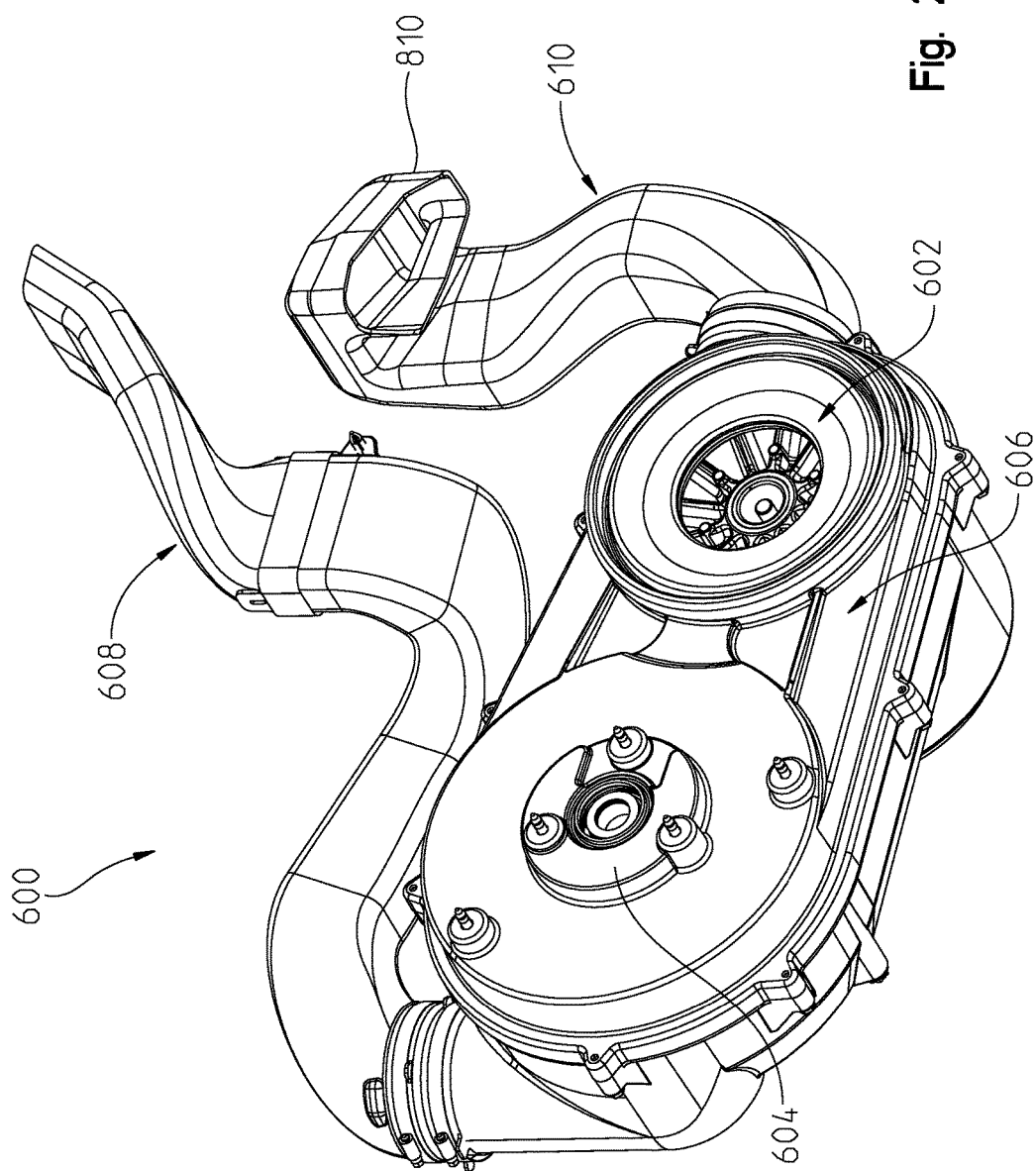
FIG. 22 shows a right rear perspective view of the CVT of FIG. 21.
Figure 23:
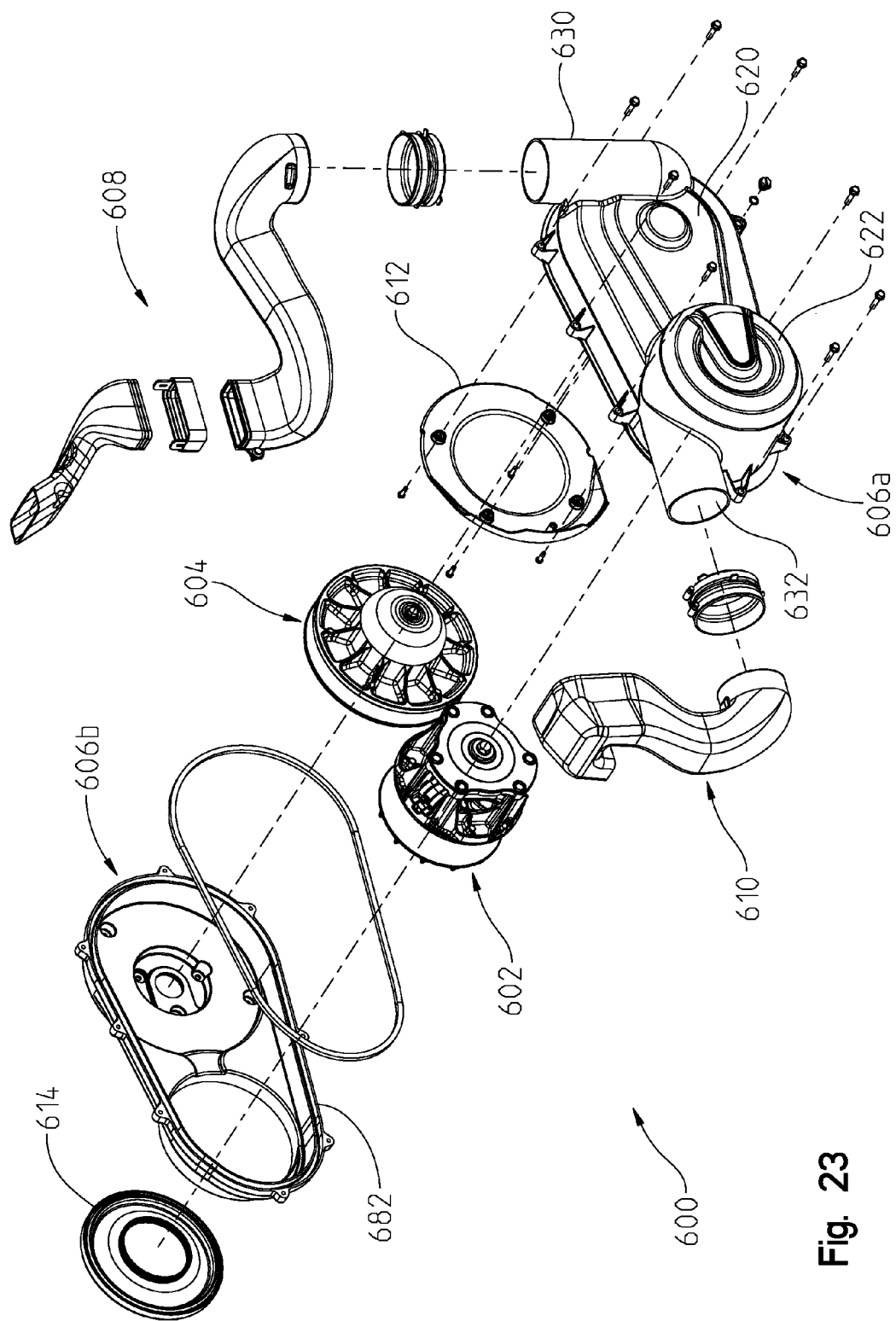
FIG. 23 shows a front exploded view of the CVT of FIG. 21.
Figure 24:
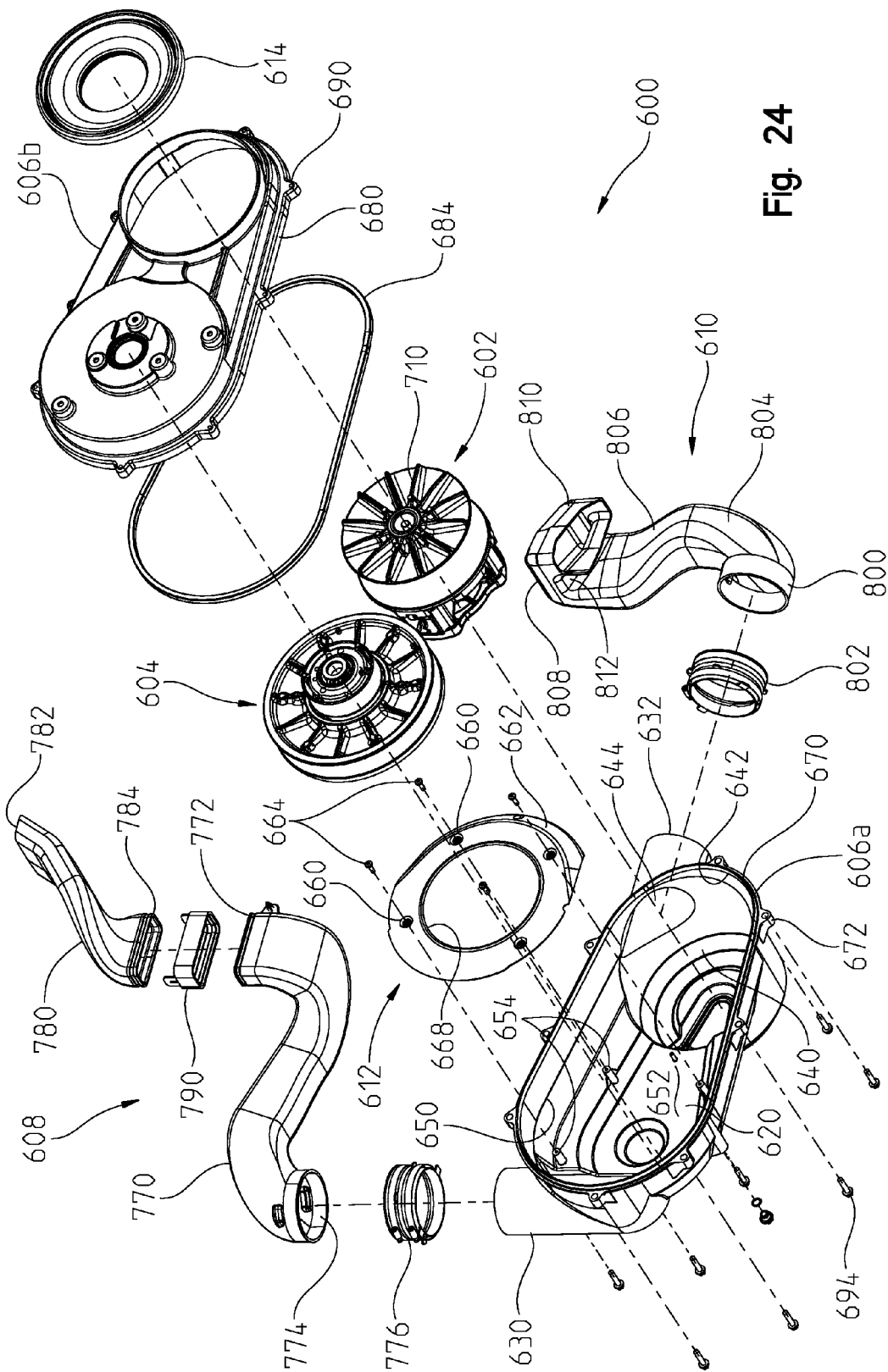
FIG. 24 shows a rear exploded view of the CVT as depicted in FIG. 22.

With reference now to FIGS. 21-26, CVT 600 will be described in greater detail. The location of CVT 600 is shown in FIG. 1 on the left hand side of ATV 2, and as should be appreciated, couples together engine output shaft 212 and transmission input shaft 214 (FIG. 7). With reference first to FIGS. 21 and 22, CVT 600 includes a drive clutch 602, driven clutch 604, outer cover 606, intake duct 608, and exhaust duct 610. With reference now to FIGS. 23 and 24, CVT 600 is shown in an exploded manner. As shown, CVT 600 further includes internal annular ring 612 and rear plate 614. The individual components of the CVT 600 will now be described in greater detail.

As shown in FIGS. 23 and 24, CVT cover 606 includes two components portion 606a and 606b. CVT cover portion 606a includes a central cover portion 620 and an enlarged cover portion 622, which overlaps drive clutch 602. Central cover portion 620 includes an intake duct at 630 while enlarged housing portion 622 includes an exhaust duct 632. As shown best in FIG. 24, enlarged housing portion 622 includes a cylindrically shaped volume 640 profiled to receive drive clutch 602 and has an annular wall at 642 providing an opening at 644 communicating with duct 632.

Figure 25:
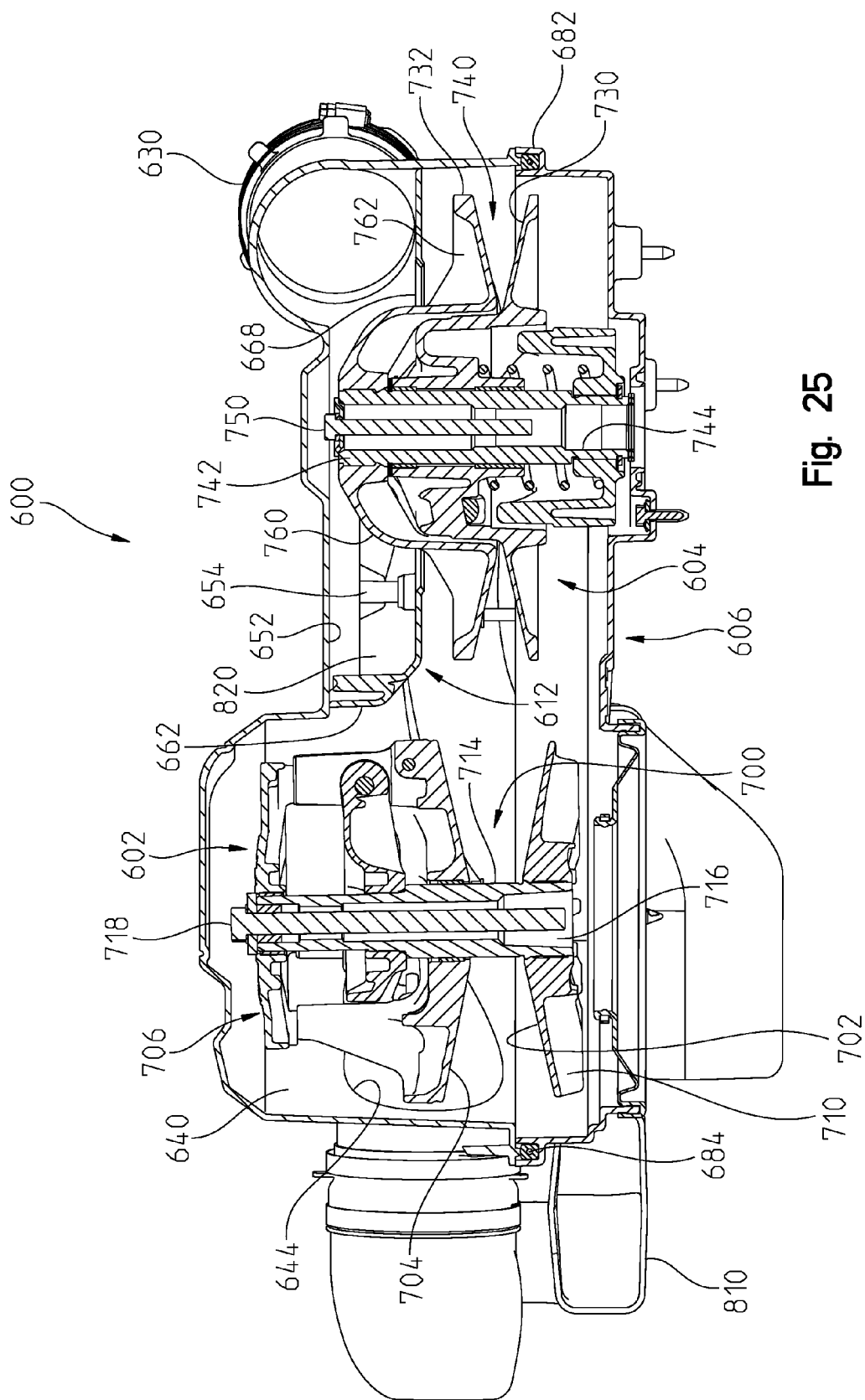
FIG. 25 shows a cross-sectional view through lines 25-25 of FIG. 21.

Housing portion 620 includes an outer wall at 650 having an opening which communicates with intake duct 630. Wall 652 of housing portion 620 includes standoffs at 654 profiled to mount annular ring 612. Annular ring 612 is generally shaped to conform to an inner volume defined by walls 650 and 652. Annular ring 612 includes mounting apertures 660 located to correspond with standoffs 654 whereby fasteners 664 may be received through apertures 660 and threadably received in standoffs 654 to retain annular ring 612 within housing 606a. Annular ring 612 includes an end wall portion 662 which extends towards and seats against wall 652 (FIG. 25). Annular ring 612 further includes a circular opening at 668 as shown in both FIGS. 24 and 25 as described further herein. CVT cover portion 606a also includes an annular lip at 670 with mounting bosses 672 surrounding the lip as shown best in FIG. 24.

With reference still to FIG. 24, housing portion 606b includes an annular lip 680 including a channel 682 (FIGS. 23 and 25) with a seal 684 positioned in channel 682. Cover portion 606b includes threaded bosses at 690 which correspond with bosses 672 such that fasteners 694 may be received through bosses 672 into threaded apertures of bosses 690 to enclose the two cover halves as shown in FIG. 25.

With reference now to FIGS. 23-25, drive clutch 602 will be described. As shown, drive clutch 602 includes a clutch sheave 700 defined by clutch halves 702, 704. Centrifugal weights 706 are provided as is known in the art. Impeller blades 710 (FIGS. 24, 25) are defined on clutch half 702 to exhaust air as defined herein. Clutch 602 further includes shaft 714 having tapered opening 716 which receives a fastener such as 718 to couple clutch 602 to engine output shaft 212 (FIG. 7).

With reference still to FIGS. 23-25, driven clutch 604 will be described in greater detail. Driven clutch 604 is defined by clutch halves 730 and 732 and which together define a sheave 740. Clutch halves 730, 732 are moveable on a shaft 742 which includes an opening 744 to couple with transmission input shaft 214 (FIG. 7) by way of fastener 750. Driven clutch 604 includes a bull nose portion 760 which protrudes through the opening 668 positioning impeller blades 762 proximate to opening 668 and to intake duct 630 as described herein.

Finally, and with reference to FIG. 24, intake duct 608 includes main duct portion 770 having an intake port at 772 and an exhaust port at 774 which couples to intake duct 630 by way of clamp 776. Intake duct 608 further includes an intake snorkel at 780 having an intake at 782 and an exhaust at 784. Exhaust 784 is coupled to intake port 772 by way of transition piece 790. As also shown in FIG. 24, exhaust duct 610 includes an intake port at 800 coupled to exhaust port 632 by way of clamp 802. Exhaust duct 610 includes a radius portion at 804 with a generally vertically extending section at 806 with a reverse bend at 808 and an exhaust port at 810. As shown, exhaust port 810 projects generally vertically downwardly and creates a rectangular notch 812 within the outer envelope of duct 610 as described herein.

With reference now to FIG. 25, the operation of CVT 600 will be described in greater detail. As shown, a reduced volume area 820 is defined between wall 652 and annular ring 612 with bull nose 760 of driven clutch 604 extending into reduced volume area 820 through annular opening 668. As mentioned before, this positions impeller blades 762 adjacent to annular opening 668 and thus adjacent to reduced volume area 820. As driven clutch 604 is spun, a vacuum is created causing a suction of air through intake port 630 into the inner volume of CVT housing 606. This incoming air cools the internal volume of the CVT, and the spinning of the drive clutch 602 including impeller blades 710, exhausts the air through opening 644 and upwardly through exhaust duct 810.

Figure 26:
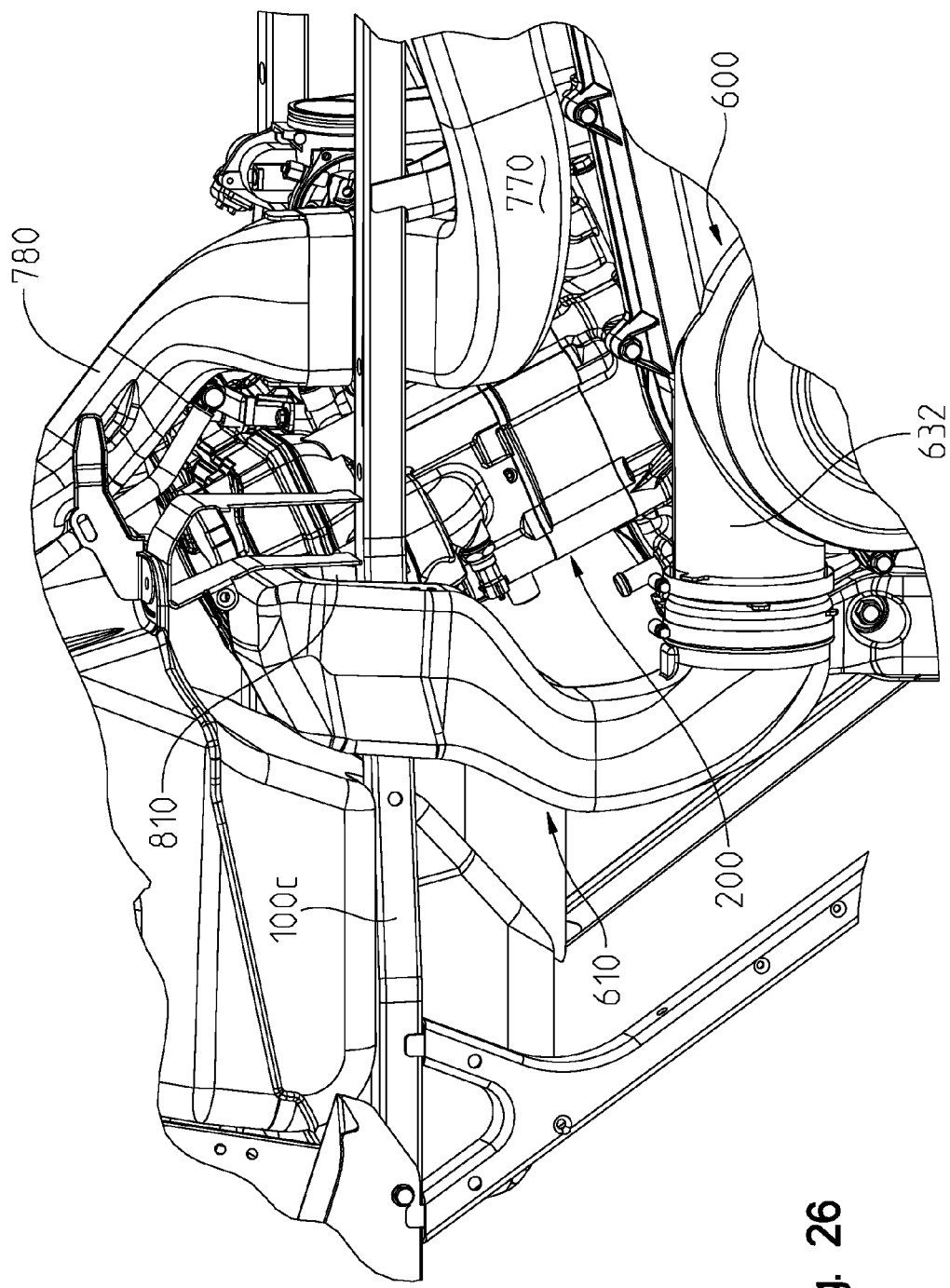
FIG. 26 shows the CVT as coupled to the engine and transmission.

The CVT 600 is shown as coupled to the engine and the transmission in FIG. 26. CVT 600 is positioned such that exhaust duct 610 overlaps top rail portion 100c with exhaust port 810 projecting air downwardly towards engine 200 and the exhaust manifold 452. Thus, as air is circulated through the CVT 600, even though the air is heated by the cooling of the CVT, the exhaust air through duct 810 is still cooler than the temperature provided at the exhaust manifold and at the engine providing ample cooling of the engine and exhaust manifold.

Figure 27:
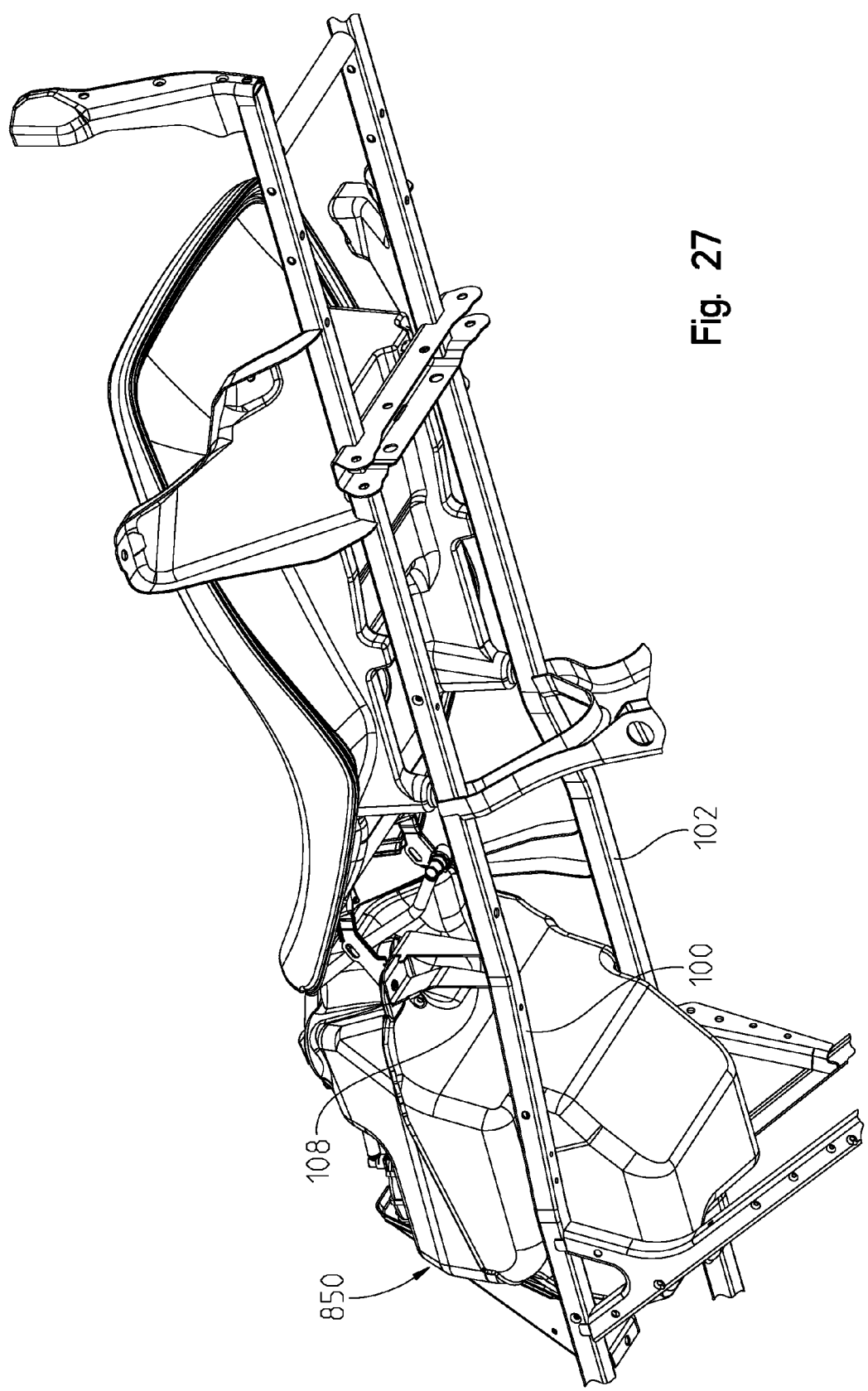
FIG. 27 is a left rear underside perspective view showing the coupling of the fuel tank and the seat assembly to the frame.
Figure 28:
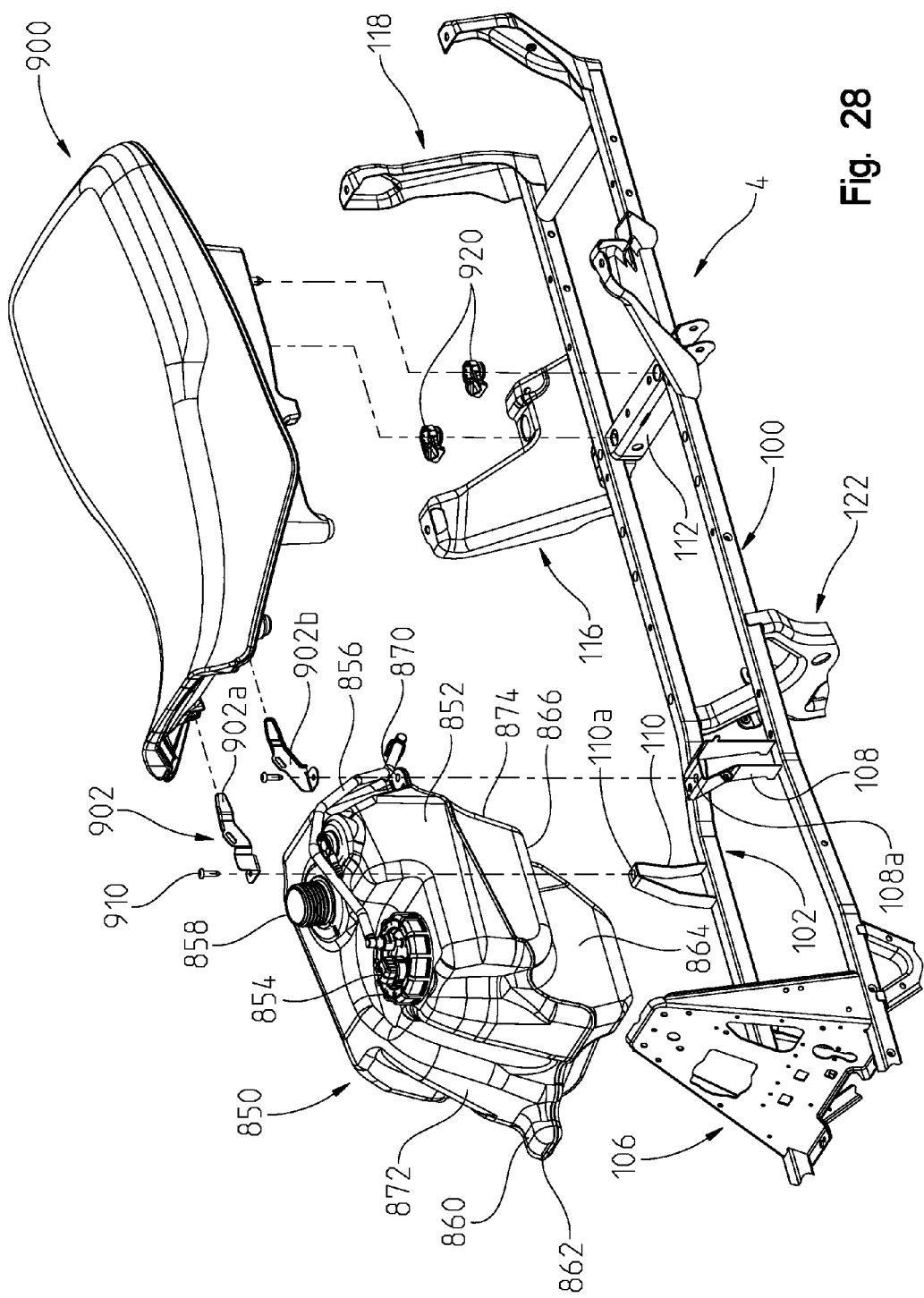
FIG. 28 is a left front exploded view of the assembly of FIG. 27.

With reference now to FIGS. 27 and 28, fuel tank 850 will be described as mounted to frame 4. Fuel tank 850 includes an upper volume portion 852 which includes an integrated fuel pump 854 including a fuel hose 856 extending from fuel tank 850 to engine 200. Pump 854 includes an automatic shut-off valve if the vehicle overturns to prevent engine 200 from continuing to operate and/or from fuel spilling. Fuel tank 850 further includes a fill spout at 858 for adding fuel to fuel tank 850. Fuel tank 850 further includes a front volume portion 860 defined as a front nose 862 which can tuck under front bracket mount 106, as described herein. Fuel tank 850 also includes a lower tank portion 864 defining underside support surfaces 866. Fuel tank 850 is mounted together with seat 900, as shown in FIG. 28. As depicted in FIG. 28, seat 900 is for a single rider.

Figure 29:
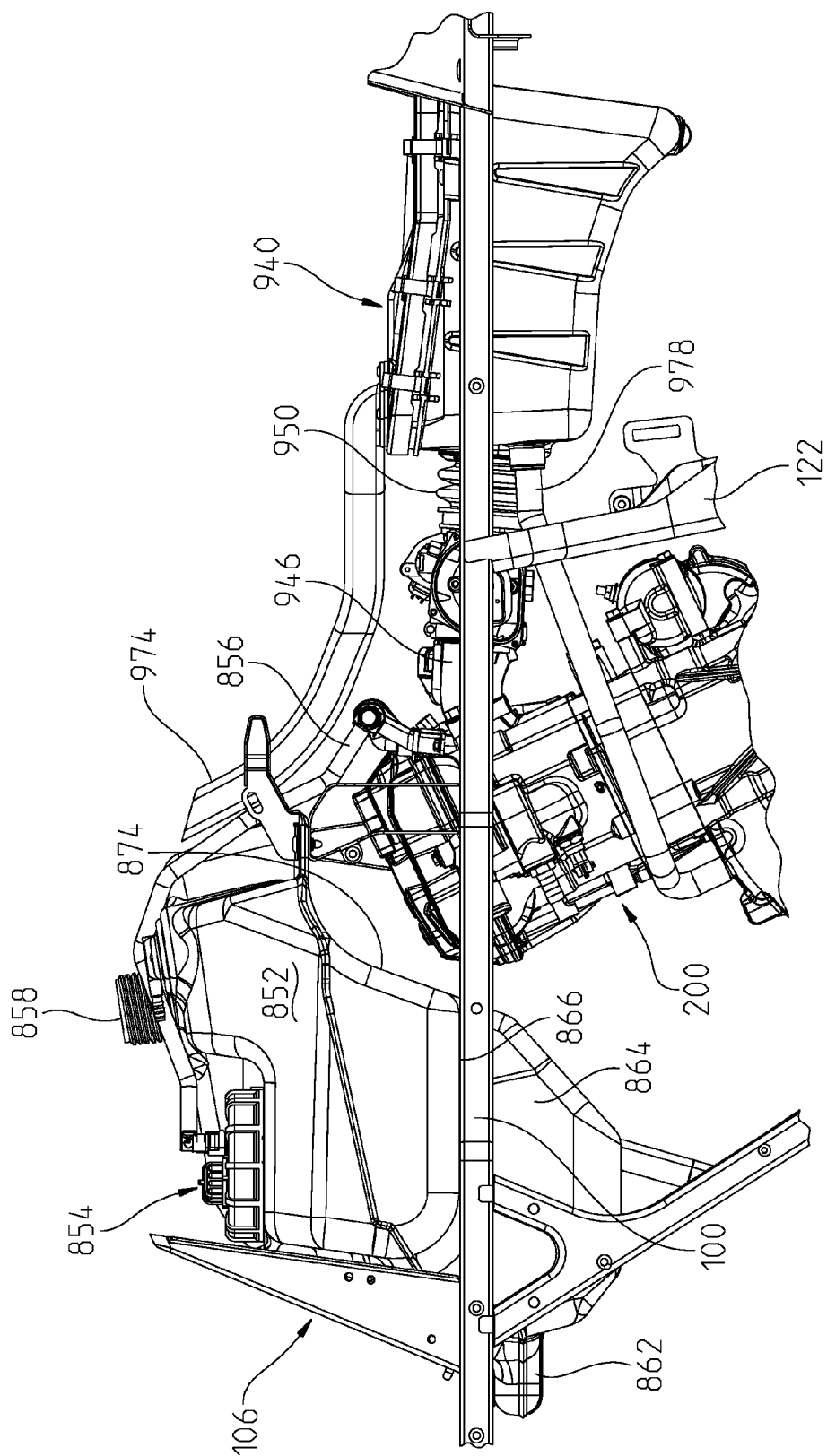
FIG. 29 is a left side view of the fuel tank, engine, air box, and throttle as coupled to the frame.

Seat 900 includes front mount brackets 902 having a rearward bracket portion 902a coupled to the seat 900 and a front mount tab 902b which can be placed adjacent to flange 870 and against brackets 108, 110. Fasteners 910 can project through mounting tabs 902b, flanges 870 and into registration with mounting apertures 108a and 110a. Snap mount tabs 920 couple seat 900 to crossbar 112. As shown in FIG. 29, fuel tank 850 is mounted to rails 100, 102, with front angled wall 872 tucked within bracket 106 and nose portion 862 projecting from beneath bracket 106. Further, rear wall 874 is shown as defining a radiused wall, scalloped out to define enough clearance to remove a spark plug from a top of engine 200.

Figure 30:
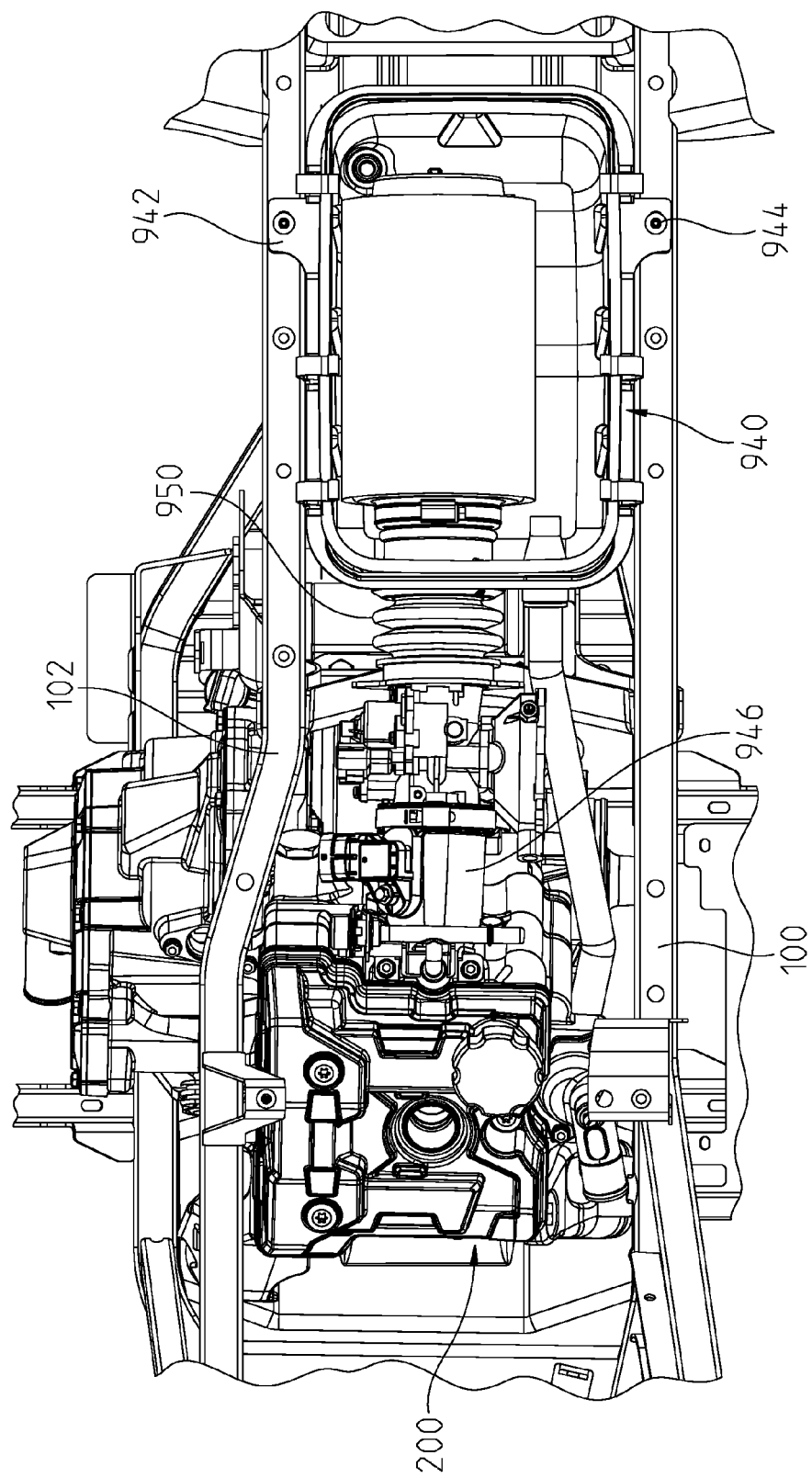
FIG. 30 is a top view of the assembly of FIG. 29.

With reference now to FIGS. 29 and 30, airbox 940 is shown coupled to rails 100, 102, by way of mounting tabs 942 and fasteners 944. A throttle body 946 is coupled directly to an intake port of engine 200 and is coupled to airbox 940 by way of a flexible bellows 950. As shown in FIGS. 29 and 30, engine is positioned in an inclined direction towards a front of the vehicle and is generally centered between upper rails 100, 102, with a top of engine 200 positioned above the rails 100, 102. Airbox 940 is positioned rearwardly of engine 200 and coupled to a top of rails 100, 102, with the throttle body 946 positioned intermediate to engine 200 and airbox 940.

Figure 31:
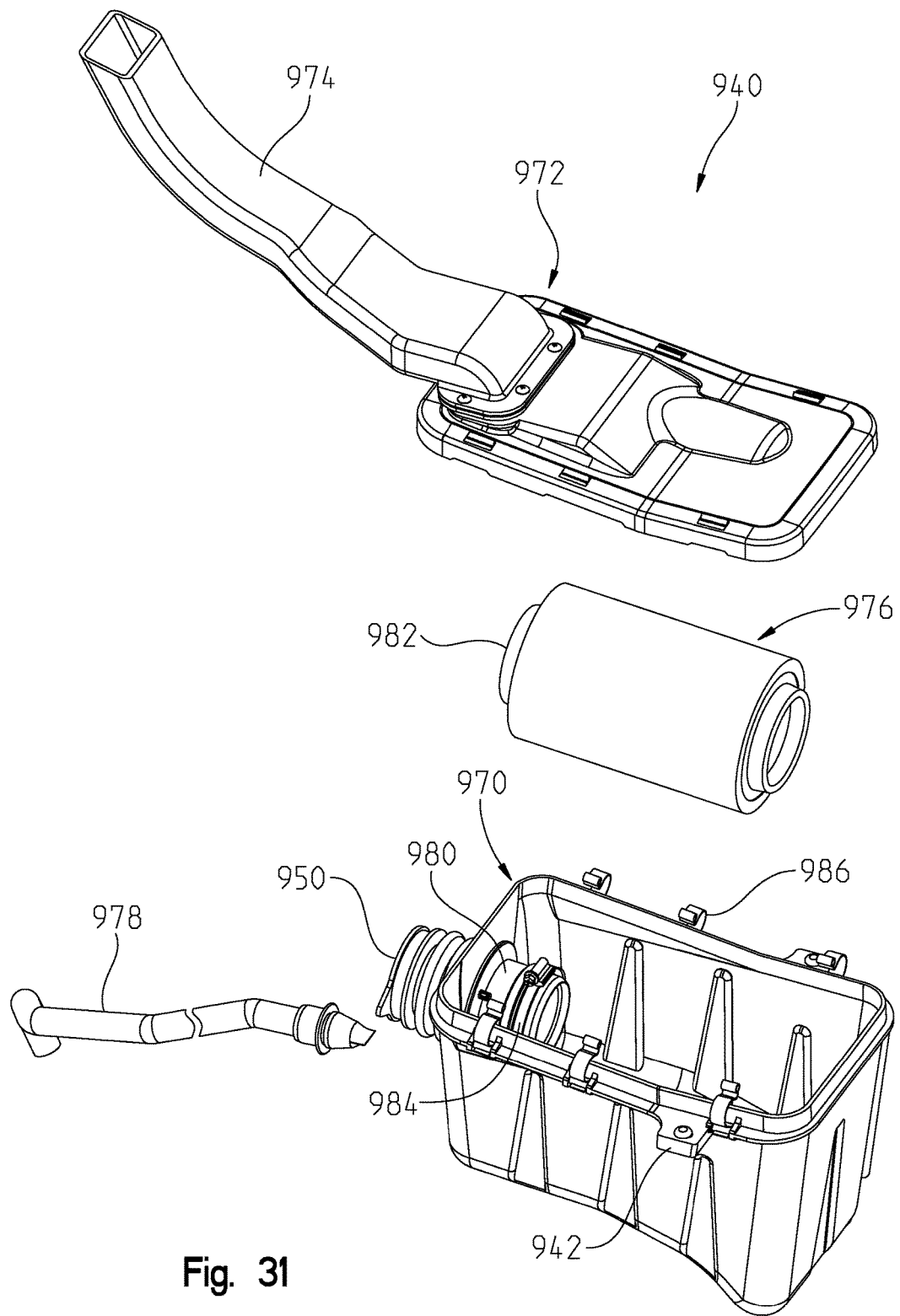
FIG. 31 shows an exploded view of the air intake system of the ATV.

With reference now to FIG. 31, airbox 940 is shown in an exploded manner to include lower airbox portion 970, airbox lid 972 which includes integrated snorkel 974, filter 976, and breather tube 978. Airbox lower portion 970 includes an intake duct 980 which couples to filter coupling 982 by way of clamp 984. Thus as installed, filter 976 is positioned in box 970 coupled to coupler 980 with lid 972 positioned over the lower portion 970 and held in place by snap rings 986. Breather tube 978 couples to the engine 200 to return unspent gasses into the airbox for recirculation.

Figure 32:
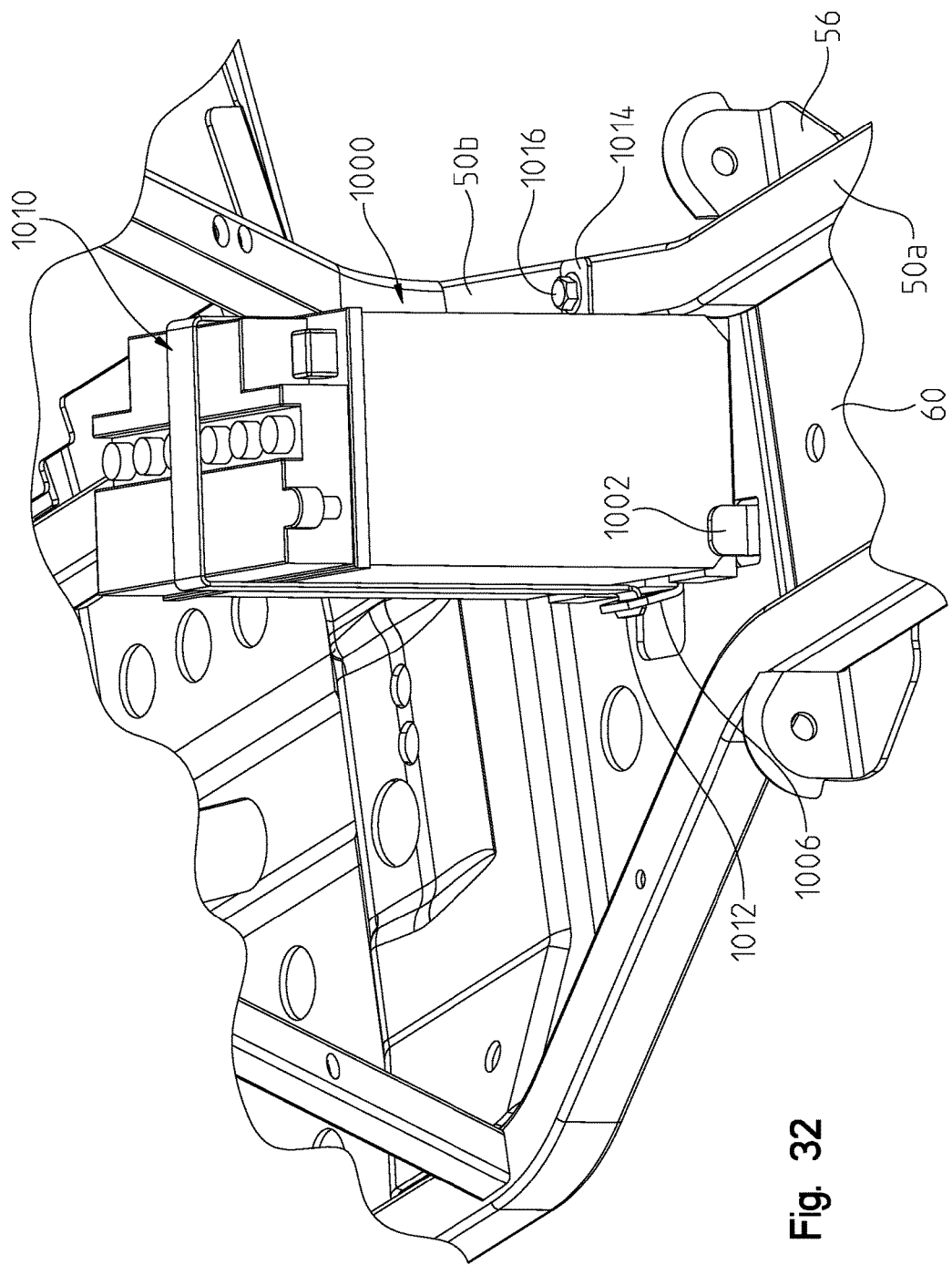
FIG. 32 shows the battery mount assembly of the ATV of the present application.

With reference now to FIG. 32, battery 1000 is shown as installed at a front of ATV, directly to lower skid plate 60. Skid plate includes front and rear struck tabs 1002, 1004 (see FIG. 5), and a struck anchor tab 1006. As shown, a battery receiving area is defined between tabs 1002, 1004; tab 1006 and an inside surface of rail 50b. A strap 1010 may be provided having a front hook 1012 engagable in a slot within tab 1006, with strap 1010 wrapped around battery as shown in FIG. 32. An opposite end of strap 1010 includes a mounting tab 1014 which can be coupled to rail 50b by way of fastener 1016. Having battery 1000 mounted directly to the skid plate mounts the battery as low as possible within the vehicle, lowering the center of gravity of the overall vehicle for increased stability.

Figure 33:
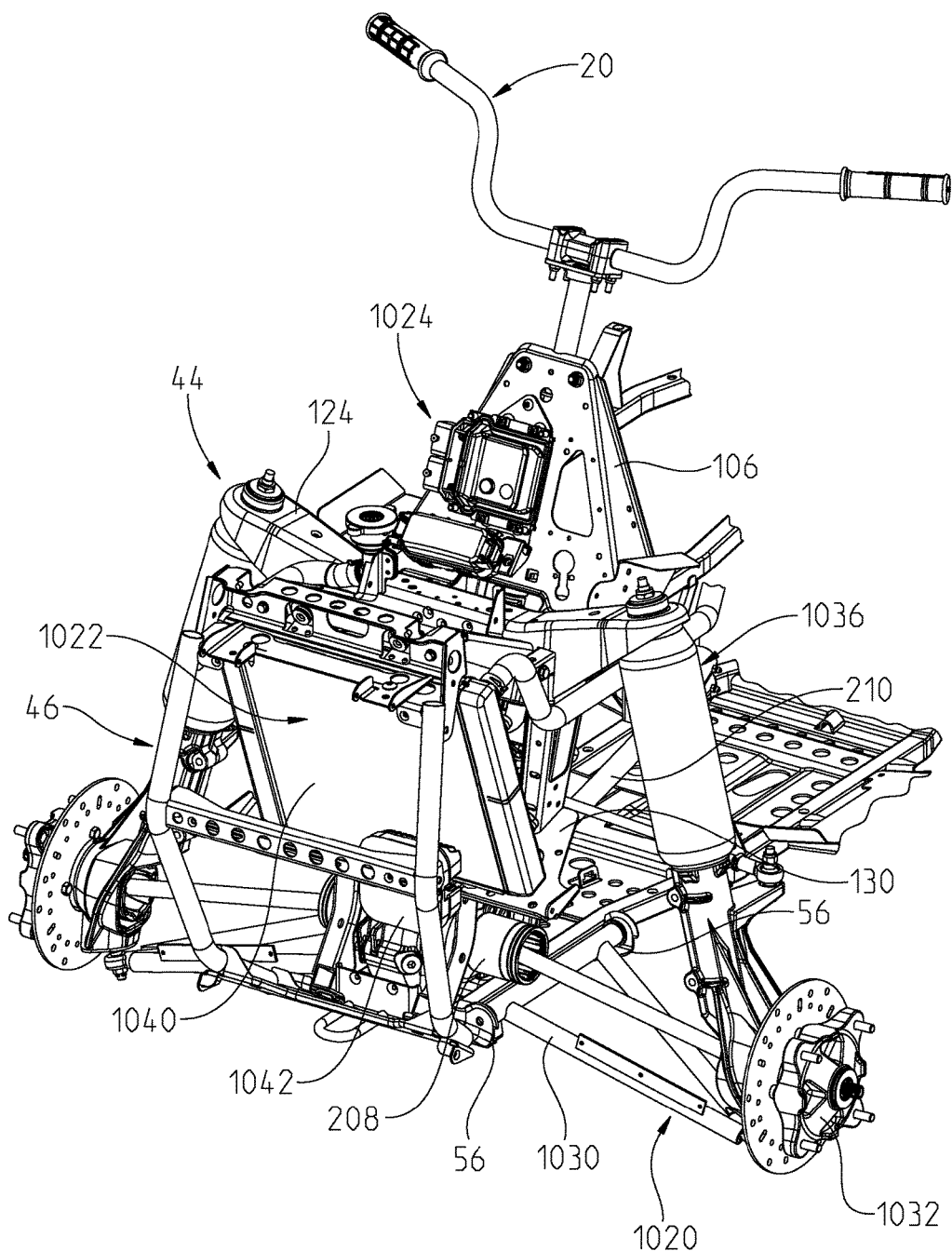
FIG. 33 shows a front perspective view showing the radiator mount and electrical assembly mount of the present application.

With reference now to FIG. 33, other systems of the ATV are shown, namely a front suspension system 1020, cooling system 1022, and electrical load center 1024. As shown, suspension system 1020 includes a lower alignment arm 1030 coupled at brackets 56 at an inner end and to wheel hub 1032 at an outer end. Wheel hub 1032 is also coupled to a strut 1036 at a lower end and to shock tower 124 at an upper end.

Cooling system 1022 includes a radiator 1040 coupled to brackets 130 positioning radiator at the front of the vehicle for maximum cooling purposes. Load center 1024 is coupled to front bracket 106 including junction boxes containing fuses and relays as well as an engine control management system (not shown). A voltage regulator 1042 can be positioned in front of the radiator for maximum cooling purposes.

Figure 34:
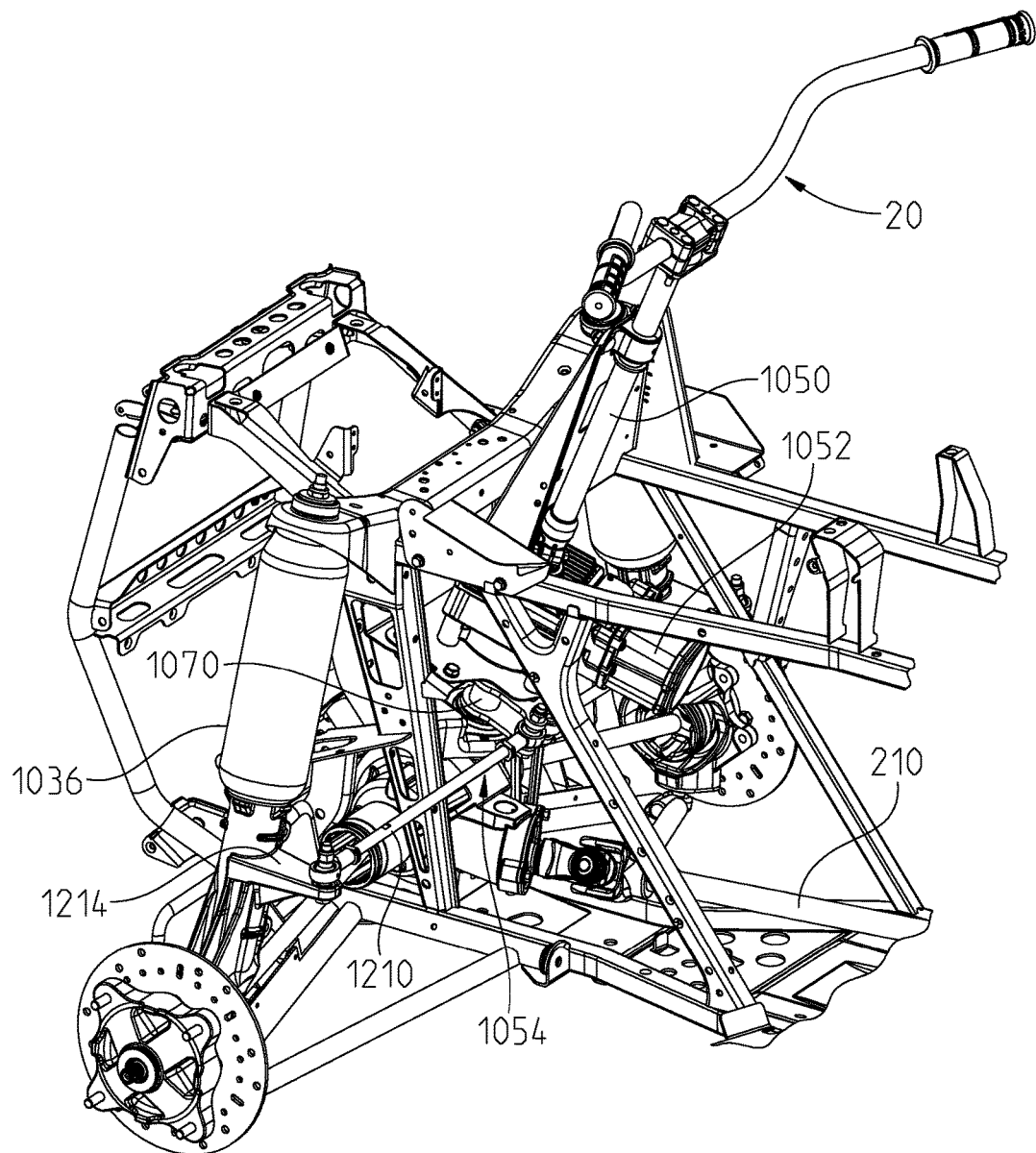
FIG. 34 shows a left rear perspective view of the assembly of FIG. 33.
Figure 35:
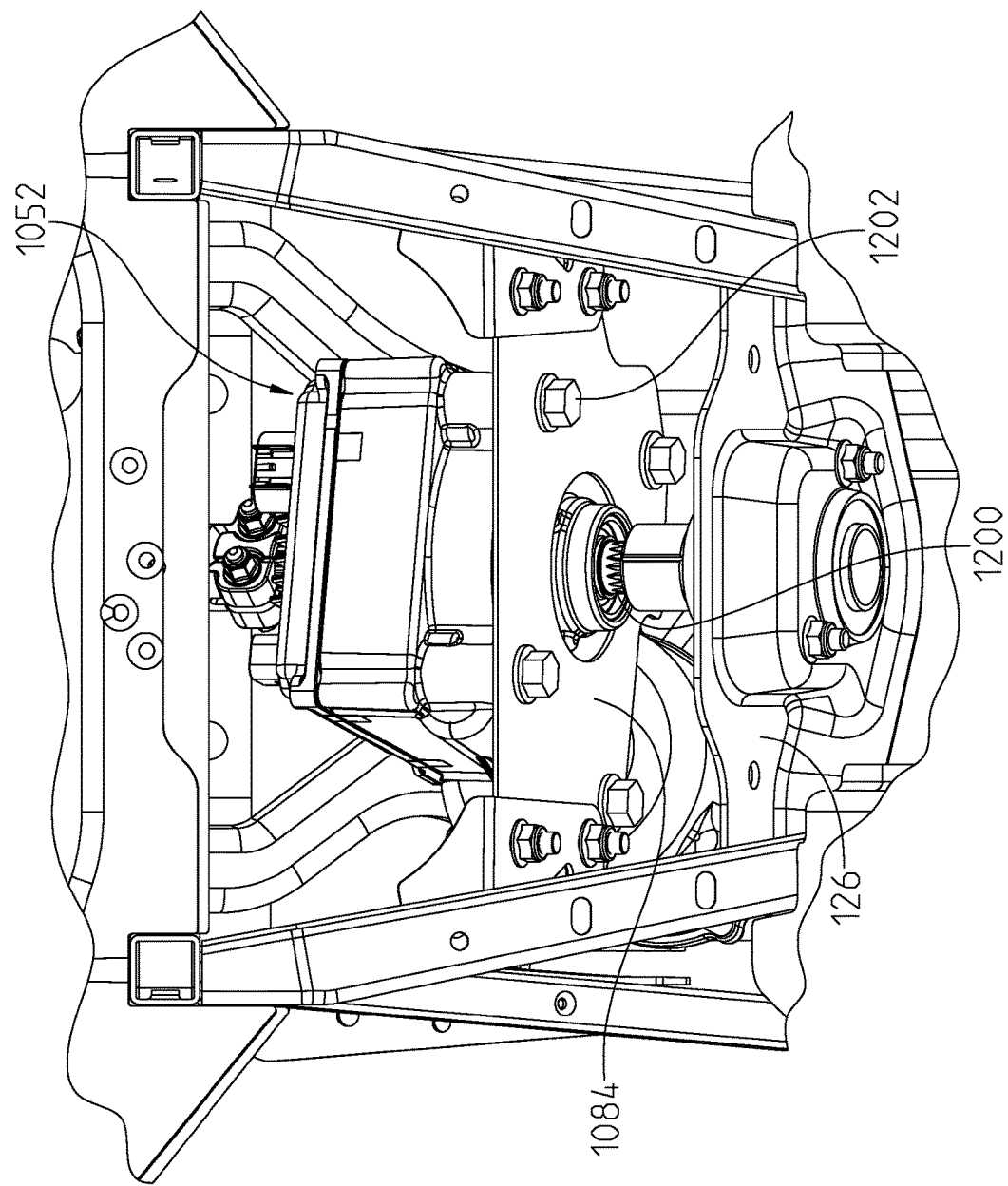
FIG. 35 shows a front perspective view of the power steering mount for the present application.
Figure 36:
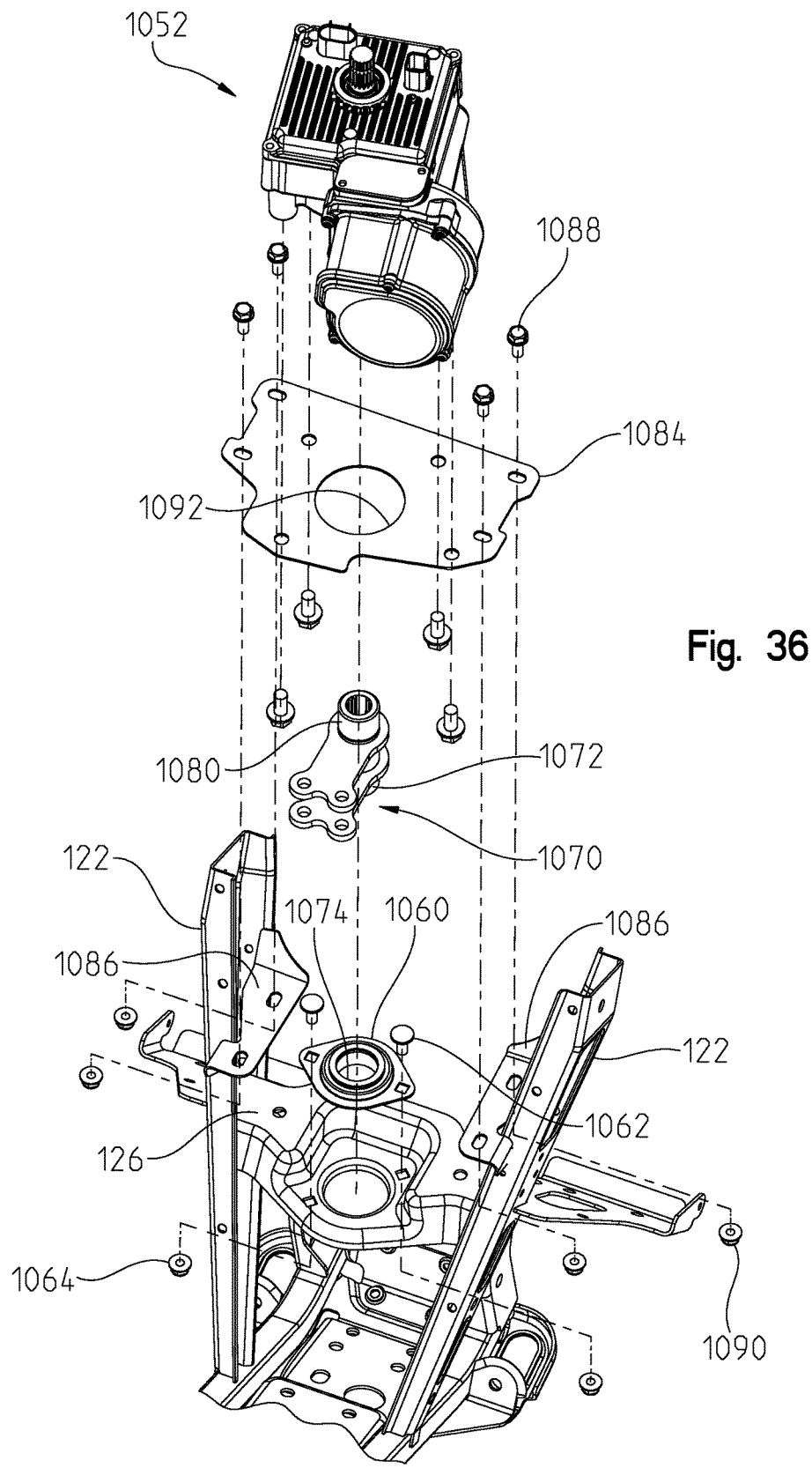
FIG. 36 shows a right rear perspective view of the power steering assembly of FIG. 35.
Figure 37:
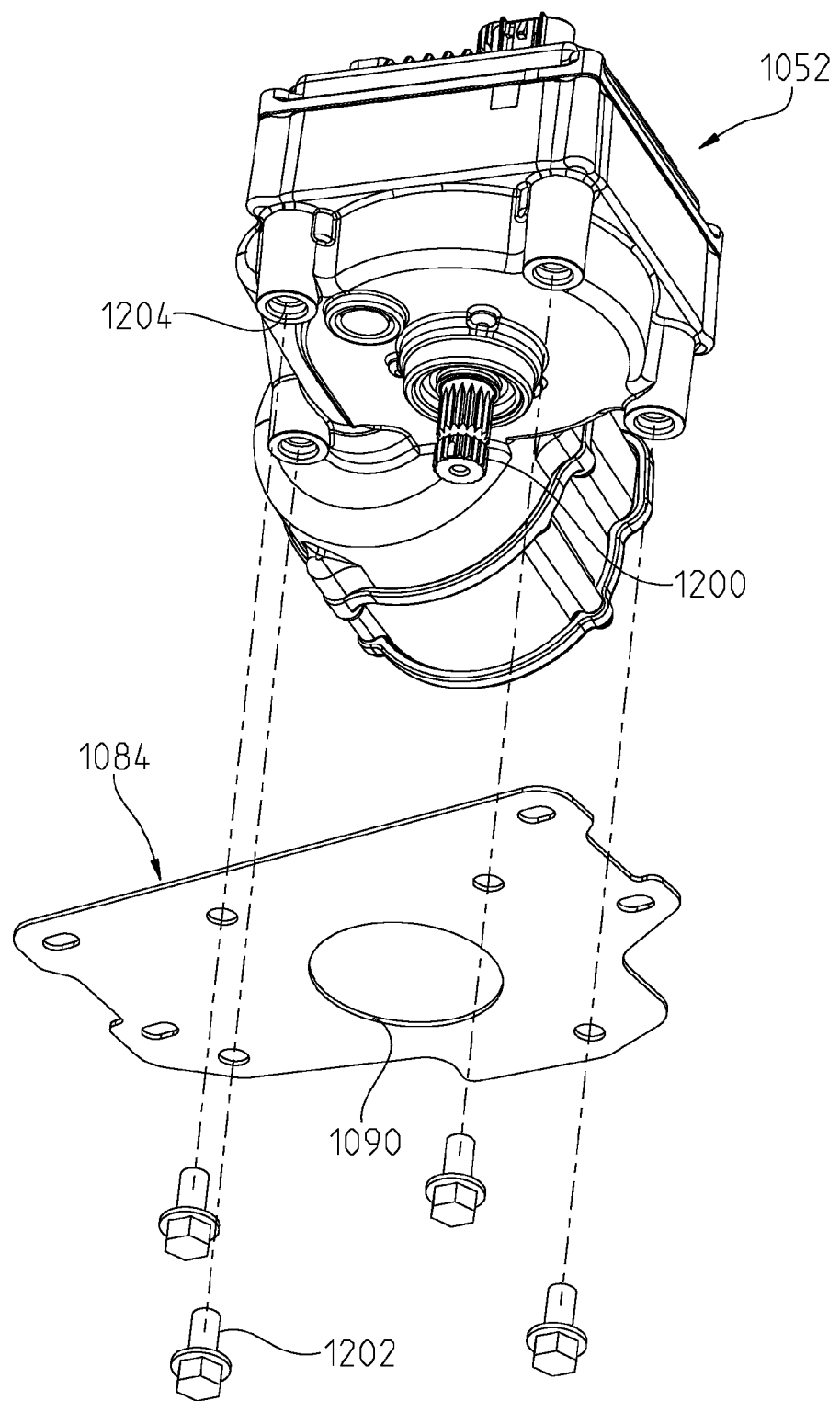
FIG. 37 is an underside perspective view of the mounting of the power steering assembly.

With reference now to FIGS. 34-37, steering system 20 will be described in greater detail. As shown in FIG. 34, steering system 20 includes steering post 1050, power steering unit 1052 and steering linkage 1054. With reference now to FIG. 36, bracket 126 retains bearing 1060 thereto by way of fasteners 1062, 1064. A pitman arm 1070 is positioned in bearing 1060 with a lower end 1072 positioned in bearing opening 1074. Pitman arm 1070 includes an upper splined collar 1080 to be driven by motor 1052 as described herein. Upper plate 1084 is coupled to brackets 1086 by way of fasteners 1088, 1090. Bracket 1084 includes an opening at 1092 generally centered with splined collar 1080. Power steering motor 1052 has a splined output shaft 1200 (FIG. 37) and is mounted to plate 1084 by way of fasteners 1202 received in threaded bosses 1204. Steering arms 1210 (FIG. 34) may be coupled between pitman arm 1070 and link 1214 on strut 1036.

Figure 38:
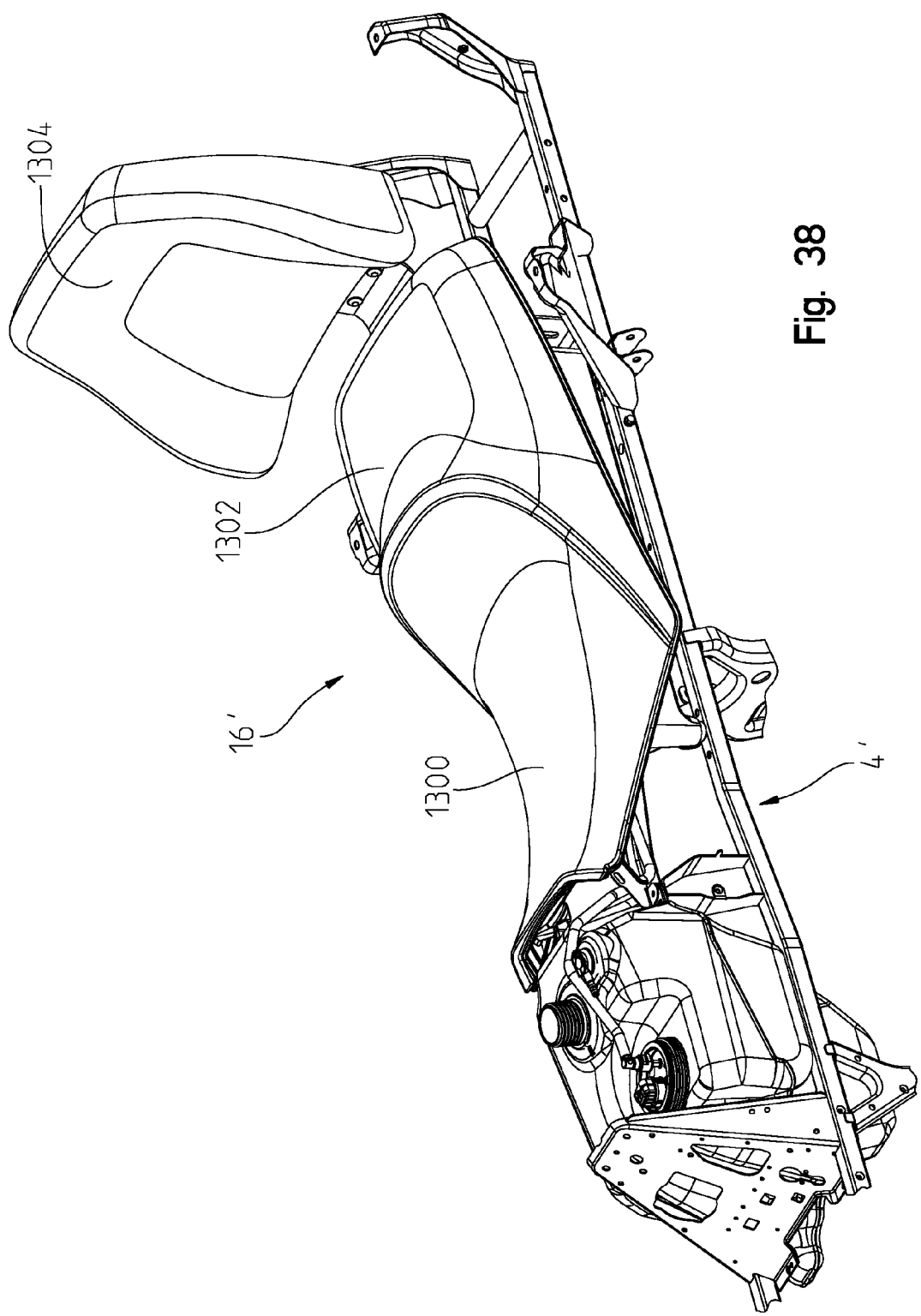
FIG. 38 shows an alternate seat assembly for use with two riders.
Figure 39:
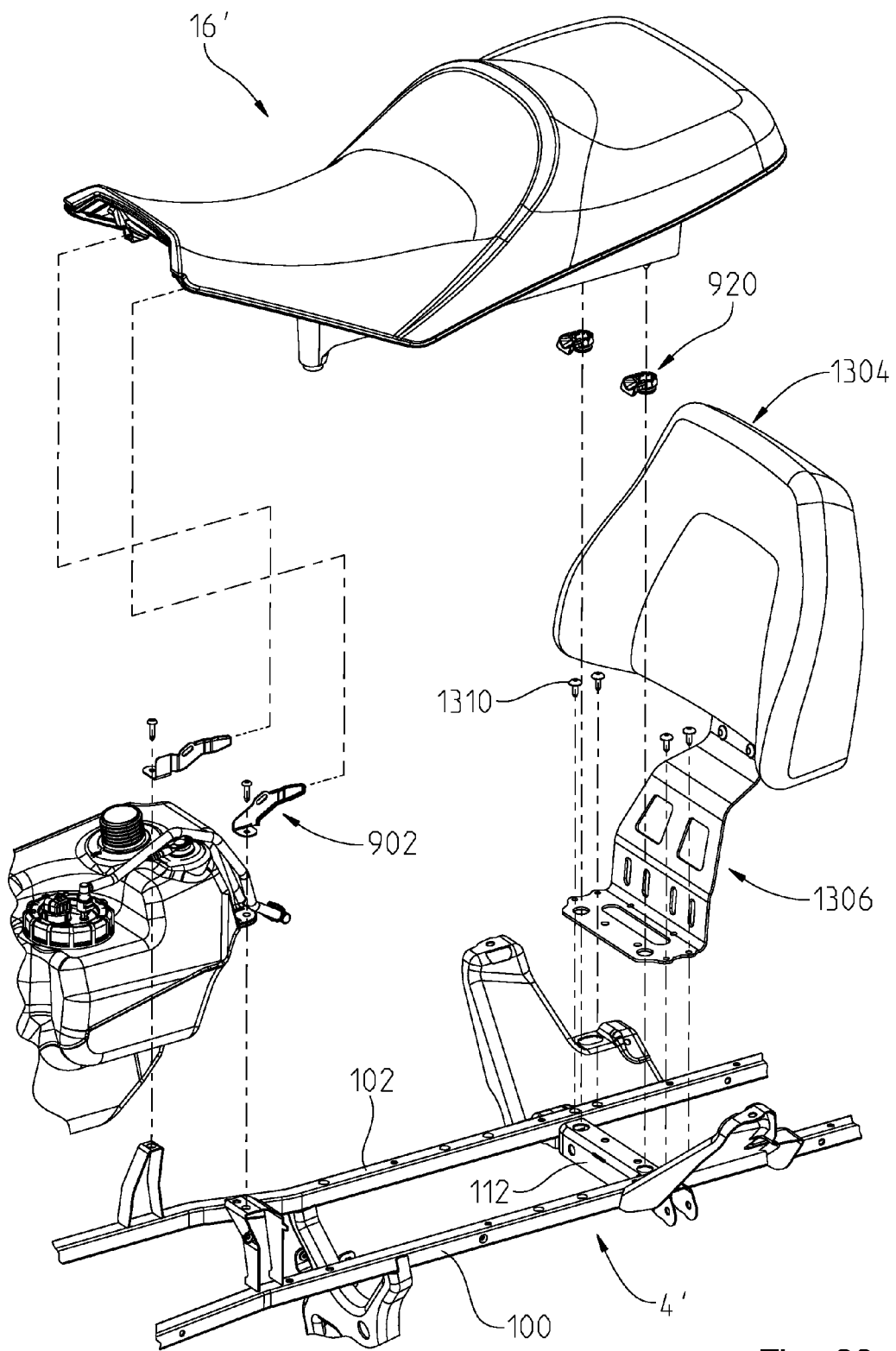
FIG. 39 shows an exploded view of the assembly of FIG. 38.

With reference now to FIGS. 38 and 39, a modified vehicle can be profiled into a two passenger configuration by slightly elongating the frame to provide a frame 4'. A two person seat is provided at 16' which is a one piece design including seat positions 1300, 1302. Seat 16' is mounted in an identical way using mounting clips 902 and clamps 920. A seat back 1304 may be mounted by way of mounting bracket 1306 by coupling bracket 1306 to rails 100, 102, by way of fasteners 1310.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. An all terrain vehicle comprising:
a frame, comprising a lower longitudinally extending frame portion and an upper frame portion, the upper frame portion having longitudinally extending upper frame rails, at least one of the upper frame rails having an inward transition defining a first distance between the upper frame rails forward of the inward transition, and a second distance rearward of the inward transition, where the first distance is greater than the second distance;
an engine supported by the lower longitudinally extending frame portion, the engine having a crankshaft and a single cylinder, the crankshaft being oriented horizontally and transverse to a longitudinal axis of the vehicle, the cylinder being tilted forward with an exhaust port extending generally forwardly and an intake port extending generally rearwardly, the cylinder being positioned intermediate the upper frame rails forward of the inward transition;
an air box supported by the upper frame rails, rearward of the inward transition;
a throttle positioned intermediate and coupled between the airbox and engine;
ground engaging members, at least some of which are drivingly coupled to the engine; and
an exhaust system coupled to the exhaust port and extending rearwardly along the at least one upper frame rail, rearward of the inward transition, wherein the exhaust system comprises an exhaust tube angled inwardly at the inward transition, with the exhaust tube extending generally rearwardly along the upper frame rail rearward of the inward transition.

2. The all terrain vehicle of claim 1, wherein the engine further comprises a drive shaft extending transversely of a longitudinal axis of the vehicle, and extending to a first side of the engine.

3. The all terrain vehicle of claim 2, further comprising a gear box positioned rearwardly of the engine, the gearbox having an input shaft extending to the first side of the engine and generally parallel to the drive shaft.

4. The all terrain vehicle of claim 3, further comprising a continuously variable transmission (CVT) having a drive clutch and a driven clutch, the drive clutch being coupled to the drive shaft and the driven clutch being coupled to the input shaft.

5. The all terrain vehicle of claim 4, further comprising an exhaust system coupled to the exhaust port and extending rearwardly along a second and opposite side of the engine.

6. The all terrain vehicle of claim 1, wherein the frame includes a generally vertically extending support member extending between the lower longitudinally extending frame portion and an upper frame portion.

7. The all terrain vehicle of claim 6, wherein the generally vertically extending support member includes a notch, inwardly directed towards the vehicle longitudinal centerline.

8. The all terrain vehicle of claim 7, further comprising an exhaust system coupled to the exhaust port and extending rearwardly and extending through the notch.

9. The all terrain vehicle of claim 6, wherein the generally vertically extending support member has a window therethrough, allowing airflow from a front side of the vertically extending support member, through to a rear side of the vertically extending support member.

10. The all terrain vehicle of claim 1, further comprising a battery coupled to the lower longitudinally extending frame portion forward of the engine.

11. The all terrain vehicle of claim 1, further comprising a fuel tank coupled to the frame forward of the engine.

12. An all terrain vehicle comprising:
a frame;
an engine supported by frame, the engine having a crankshaft being oriented transverse and horizontal to a longitudinal axis of the vehicle, the engine having a single cylinder, the cylinder having an exhaust port extending generally forwardly and an intake port extending generally rearwardly;
a continuously variable transmission (CVT) coupled to the engine and comprising a drive clutch and a driven clutch, the drive clutch being coupled to the crankshaft;
a cooling assembly coupled to the CVT, having a cover enclosing the drive and driven clutches, an intake duct is coupled to the cover adjacent to the driven clutch to supply air to the driven clutch, and an exhaust duct is coupled to the cover adjacent to the drive clutch to exhaust air from the driven clutch, the exhaust duct having an outlet port extending at least partially forward of the exhaust port and exhausting air generally adjacent to the engine exhaust manifold; and
ground engaging members, at least some of which are drivingly coupled to, the engine.

13. The all terrain vehicle of claim 12, further comprising a drive shaft and a gear box positioned rearwardly of the engine, the gearbox having an input shaft extending generally parallel to the drive shaft.

14. The all terrain vehicle of claim 13, wherein the drive clutch is coupled to the crankshaft and the driven clutch is coupled to the gearbox input shaft.

15. The all terrain vehicle of claim 12, wherein the driven clutch includes impellers to create suction into the cover.

16. The all terrain vehicle of claim 15, wherein the cover includes a baffle having an annular opening, and the driven clutch has a bull nose portion projecting through the opening.

17. The all terrain vehicle of claim 16, wherein the driven clutch impellers are positioned adjacent to the baffle.

18. The all terrain vehicle of claim 17, wherein the baffle creates a reduced volume area within the cover and the intake duct opens into the reduced volume area.

19. An all terrain vehicle comprising:
a frame, comprising a lower longitudinally extending frame portion and an upper frame portion, and a generally vertically extending support positioned between the upper and lower frame portions;
an engine having a wet sump oil supply, the engine being coupled to the frame forward of the generally vertically extending support;
a transmission coupled to the engine;
engine supports coupled to the lower longitudinally extending frame portion and the engine, and suspending the engine above the lower longitudinally extending frame portion, and a rear engine mount coupling the engine to the generally vertically extending support;
a front transmission mount coupling the transmission to the generally vertically extending support rearwardly of the generally vertically extending support; and
ground engaging members, at least some of which are drivingly coupled to, the engine.

20. The all terrain vehicle of claim 19, further comprising an engine exhaust system coupled to the engine and extending rearwardly.

21. The all terrain vehicle of claim 20, wherein the vertically extending support has an opening and the engine exhaust system extends through the opening.

22. The all terrain vehicle of claim 21, wherein the opening is a notch along a side edge of the vertically extending support.

23. The all terrain vehicle of claim 19, further comprising a battery coupled to the lower longitudinally extending frame portion forward of the engine.

24. An all terrain vehicle comprising:
a frame, comprising a lower longitudinally extending frame portion and an upper frame portion, and a generally vertically extending support positioned between the upper and lower frame portions;
an engine;
a transmission;
a rear side of the engine being coupled to a front side of the generally vertically extending support and a front side of the transmission being coupled to a rear side of the generally vertically extending support;
front engine supports coupled to the lower longitudinally extending frame portion and the engine, suspending the engine above the lower longitudinally extending frame portion; and
ground engaging members, at least some of which are drivingly coupled to, the engine.

25. The all terrain vehicle of claim 24, wherein the vertically extending support includes an opening thereto, the rear side of the engine and the front side of the transmission being coupled through the opening.

26. The all terrain vehicle of claim 25, wherein the vertically extending support includes a bracket positioned adjacent to the opening, and the rear side of the engine and the front side of the transmission are coupled to the bracket.

27. The all terrain vehicle of claim 24, wherein the engine has a wet sump oil supply, the engine being coupled to the frame forward of the generally vertically extending support.

28. The all terrain vehicle of claim 24, wherein the front engine supports comprise support legs.

29. The all terrain vehicle of claim 28, wherein the front engine supports are die cast legs.

30. The all terrain vehicle of claim 28, wherein the front engine supports further include resilient mounts positioned under the support legs.

31. The all terrain vehicle of claim 28, wherein the lower longitudinally extending frame portion includes a skid plate and the support legs are coupled to the skid plate.

32. The all terrain vehicle of claim 24, further comprising a battery coupled to the lower longitudinally extending frame portion forward of the engine.

33. An all terrain vehicle comprising:
a frame, comprising a lower longitudinally extending frame portion and an upper frame portion;
an engine;
a drive assembly, including a transmission, a front final drive and a rear final drive;
engine supports coupled to the lower longitudinally extending frame portion and the engine, and suspending the engine above the lower longitudinally extending frame portion;
the rear final drive being coupled to rear wheels; and
the front final drive being coupled to front wheels by a drive shaft, the drive shaft extending from the drive assembly to the front final drive, the front drive shaft extending along one lateral side of the engine with the engine supports straddling the drive shaft.

34. The all terrain vehicle of claim 33, wherein the frame further comprises a generally vertically extending support positioned between the upper and lower frame.

35. The all terrain vehicle of claim 34, further comprising a rear engine mount coupling the engine to the generally vertically extending support portion.

36. The all terrain vehicle of claim 33, wherein the vertically extending support has an opening and the engine exhaust system extends through the opening.

37. The all terrain vehicle of claim 36, wherein the opening is a notch along a side edge of the vertically extending support.

38. The all terrain vehicle of claim 33, further comprising a battery coupled to the lower longitudinally extending frame portion forward of the engine.

39. An all terrain vehicle, comprising:
a powertrain;
a frame having a lower longitudinally extending frame portion and an upper longitudinally extending frame portion, the upper frame portion has longitudinally extending upper frame rails, where at least one of the upper frame rails has an inward transition defining a first distance between the upper frame rails forward of the inward transition, and a second distance rearward of the inward transition, where the first distance is greater than the second distance; and
an exhaust system for the powertrain comprises an exhaust tube with an inwardly angled portion at the inward transition, with the exhaust tube extending generally rearwardly along the upper frame rail portion rearward of the inward transition, the exhaust system conforming to and being coupled to the one upper frame rail.

40. The all terrain vehicle of claim 39, wherein the powertrain comprises an internal combustion engine supported by the lower longitudinally extending frame portion, the engine having a crankshaft and a single cylinder, the crankshaft being oriented horizontally and transverse to a longitudinal axis of the vehicle, the cylinder being tilted forward with an exhaust port extending generally forwardly and an intake port extending generally rearwardly.

41. The all terrain vehicle of claim 40, comprising an air box supported by the upper frame rails, rearward of the inward transition and a throttle positioned intermediate and coupled between the airbox and engine.

42. The all terrain vehicle of claim 39, wherein the powertrain comprises an internal combustion engine having an engine output shaft extending transversely of a longitudinal axis of the vehicle, and extending to a first side of the engine.

43. The all terrain vehicle of claim 42, wherein the powertrain further comprises a gear box positioned rearwardly of the engine, the gearbox having an input shaft extending to the first side of the engine and generally parallel to the engine output shaft.

44. The all terrain vehicle of claim 43, wherein the powertrain further comprises a continuously variable transmission (CVT) having a drive clutch and a driven clutch, the drive clutch being coupled to the engine output shaft and the driven clutch being coupled to the input shaft.

45. The all terrain vehicle of claim 39, wherein the frame further comprises a generally vertically extending support member extending between the lower longitudinally extending frame portion and an upper frame portion.

46. The all terrain vehicle of claim 45, wherein the generally vertically extending support member includes a notch, inwardly directed towards the vehicle longitudinal centerline.

47. The all terrain vehicle of claim 46, wherein the exhaust system comprises an exhaust tube extending rearwardly from the powertrain and through the notch.

48. The all terrain vehicle of claim 47, wherein the a generally vertically extending support member has a window therethrough, allowing airflow from a front side of the vertically extending support member, through to a rear side of the vertically extending support member.

49. An all terrain vehicle, comprising:
 an engine;
 a frame having a lower longitudinally extending frame portion and an upper longitudinally extending frame portion;
 an exhaust system comprises an exhaust tube extending generally rearwardly along the frame rearward of the engine;
 an exhaust shield, surrounding at least a portion of the exhaust tube, the shield including an inner and outer shield which conform to encompass a portion of the length of the exhaust tube, the inner and outer shields being coupled to the frame rearward of the inward transition; and
 wherein the upper frame portion has longitudinally extending upper frame rails, the inner and outer shields being coupled to one of the upper frame rails.

50. The all terrain vehicle of claim 49, wherein at least one of the upper frame rails has an inward transition defining a first distance between the upper frame rails forward of the inward transition, and a second distance rearward of the inward transition, where the first distance is greater than the second distance.

51. The all terrain vehicle of claim 50, wherein the exhaust tube extends generally rearwardly along the upper frame rail portion rearward of the inward transition.

52. The all terrain vehicle of claim 51, wherein the inner and outer shields are coupled to the one upper frame rail rearward of the inward transition.

* * * * *